United States Patent
Park et al.

(10) Patent No.: US 9,350,270 B2
(45) Date of Patent: May 24, 2016

(54) DRIVING APPARATUS AND METHOD FOR MODULAR MULTI-LEVEL CONVERTER

(71) Applicant: KOREA ELECTROTECHNOLOGY RESEARCH INSTITUTE, Changwon-si, Gyeongsangnam-do (KR)

(72) Inventors: Jung Woo Park, Changwon-si (KR); Dae Wook Kang, Changwon-si (KR); Dong Wook Yoo, Changwon-si (KR); Ji Woo Moon, Busan (KR); Jin Soo Kwon, Changwon-si (KR); Chun Sung Kim, Changwon-si (KR); Deuk Woo Pae, Changwon-si (KR)

(73) Assignee: KOREA ELECTROTECHNOLOGY RESEARCH INSTITUTE, Changwon-Si, Gyeongsangnam-Do (KR)

( * ) Notice: Subject to any disclaimer, the term of this patent is extended or adjusted under 35 U.S.C. 154(b) by 0 days.

(21) Appl. No.: 14/323,380

(22) Filed: Jul. 3, 2014

(65) Prior Publication Data
US 2015/0229234 A1 Aug. 13, 2015

(30) Foreign Application Priority Data

Feb. 11, 2014 (KR) .................. 10-2014-0015446

(51) Int. Cl.
*H02M 7/797* (2006.01)
*H02M 1/12* (2006.01)
(Continued)

(52) U.S. Cl.
CPC ............... *H02M 7/797* (2013.01); *H02M 1/12* (2013.01); *H02M 5/4585* (2013.01); *H02J 3/36* (2013.01); *H02M 2001/0003* (2013.01); *H02M 2007/4835* (2013.01); *Y02E 60/60* (2013.01)

(58) Field of Classification Search
CPC .......... H02M 2007/4835; H02M 1/12; H02M 7/487; H02M 5/4585; H02M 7/483; H02M 7/49; H02M 7/797; H02M 2001/123; H02M 7/48; H02M 5/225; H02M 5/293; H02M 5/458; H02M 7/219; H02M 7/53871; H02M 7/5395
See application file for complete search history.

(56) References Cited

U.S. PATENT DOCUMENTS 5,644,483 A * 7/1997 Peng et al. ...................... 363/37
5,731,965 A * 3/1998 Cheng et al. .................... 363/41
(Continued)

OTHER PUBLICATIONS

IEEE Transactions on Power Delivery, vol. 27. No. 3, "Predictive Control of a Modular multilevel Converter for a Back-to-Back HVDC System".*

(Continued)

*Primary Examiner* — Adolf Berhane
*Assistant Examiner* — Henry Lee, III
(74) *Attorney, Agent, or Firm* — Hauptman Ham, LLP

(57) ABSTRACT

The present invention relates to a driving method for a modular multi-level converter. The driving method include inputting a current reference value ($i^*_{pj2}$) of the upper valve of the modular multi-level converter, measuring a current value ($i_{pj2}$) of the valve, calculating an error value ($err_{pj2}$) between the current reference value and the measured current value of the upper valve, measuring a DC link voltage value ($V_{dc2}$) of the modular multi-level converter, measuring a AC-grid voltage value ($E_{sj}$) of the modular multi-level converter, and calculating a voltage reference value ($u^*_{pj2}$) using the current reference value ($i^*_{pj2}$), the measured current value ($i_{pj2}$), the error value ($err_{pj2}$), the DC link voltage value ($V_{dc2}$), and the AC-grid voltage value ($E_{sj}$).

57 Claims, 24 Drawing Sheets

(51) Int. Cl.
*H02M 5/458* (2006.01)
*H02J 3/36* (2006.01)
*H02M 1/00* (2006.01)
*H02M 7/483* (2007.01)

(56) References Cited

U.S. PATENT DOCUMENTS

| | | | |
|---|---|---|---|
| 8,395,918 B2* | 3/2013 | Sakakibara | 363/127 |
| 8,866,340 B2* | 10/2014 | Alam et al. | 307/60 |
| 2012/0081200 A1* | 4/2012 | Silva | 336/20 |
| 2012/0170338 A1* | 7/2012 | Trainer et al. | 363/127 |
| 2012/0300514 A1* | 11/2012 | Kolar et al. | 363/41 |
| 2012/0310426 A1* | 12/2012 | Tarnowski | 700/287 |

OTHER PUBLICATIONS

IEEE Transactions on Industrial Electronics, vol. 55, No. 10, Optimal Predictive Control of three-Phase NPC Multilevel Converter for Power Quality Applications.*

IEEE Transactions on Industrial Electronics, vol. 59, No. 7, "Predictive Control of AC-AC Modular Multilevel Converters".*

IEEE Transactions on Industrial Electronics, vol. 54, No. 2, "Zero-Steady-State-Error Input-Current Controller for Regenerative Multilevel Converters Based on Single-Phase Cells".*

Antonios A. et al., Power Electronics and Application, EPE, on Dynamics and Voltage Control of the Modular Multilevel Converter, Sep. 2009, 10 pages.

Maryam S. et al., IEEE Transactions on power delivery, "Dynamic Performance of a Modular Multilevel Back-to-Back HVDC System", Oct. 2010, pp. 2903-2912, vol. 25, No. 4.

Qingrui T. et al., IEEE Transactions on power delivery, "Reduced Switching-Frequency Modulation and Circulating Current Suppression for Modular Multilevel Converters", Jul. 2011, pp. 2009-2017, vol. 26, No. 3.

Qingrui T. et al., IEEE Transactions on power delivery, "Suppressing DC Voltage Ripples of MMC-HVDC Under Unbalanced Grid Conditions", Jul. 2012, pp. 1332-1338, vol. 27, No. 3.

Maryam Saeedifard et al., 'Dynamic Performance of a Modular Multilevel Back-to-Back HVDC System', IEEE Transactions on Power Delivery, Oct. 2014, pp. 2903-2912, vol. 25, No. 4.

Antonios Antonopoulos et al., 'On Dynamics and Voltage Control of the Modular Multilevel Converter', 2009, 10 pages.

Dingrui Tu et al., 'Reduced Switching-Frequency Modulation and Circulating Current Suppression for Modular Multilevel Converters', IEEE Transactions on Power Delievery, Jul. 2011, pp. 2009-2017, vol. 26, No. 3.

Qingrui Tu et al., 'Suppressing DC Voltage Ripples of MMC-HVDC Under Unbalanced Grid Conditions', IEEE Transactions on Power Delievery, Jul. 2012, pp. 1332-1338, vol. 27, No. 3.

* cited by examiner (a)

(b)

(c)

| PARAMETER | EQUIVALENT CONSTANT |
|---|---|
| Active Power | 4MW |
| Reactive Power | 0.8MVar |
| AC System Voltage | 11500V |
| AC System Inductance | 19.35mH |
| DC Bus Voltage | 20kV |
| DC Resistance | 0.1 Ohm |
| Number of SMs per VBE | 10 |
| SM Capacitance | 0.002F |
| SM Capacitor Voltage | 2000V |
| VBE Inductance | 0.03H |
| Carrier Frequency | 500Hz |

FIG. 16

DRIVING APPARATUS AND METHOD FOR MODULAR MULTI-LEVEL CONVERTER

CROSS-REFERENCE TO RELATED APPLICATION

This application claims under 35 U.S.C. §119(a) the benefit of Korean Patent Application No. 10-2014-0015446 filed Feb. 11, 2014, the entire contents of which are incorporated herein by reference.

BACKGROUND (a) Technical Field

The present invention relates to a driving apparatus and method for a modular multi-level converter. More particularly, it relates to a driving apparatus and method for controlling submodules by an upper valve or a lower valve of a valve branch taking charge of each phase.

(b) Background Art

When energy needs to be transported from an offshore wind farm to a main land using a submarine cable of about 100 kilometers or more, it is known that the High Voltage Direct-Current (HVDC) transmission is much more economical than the High Voltage Alternating-Current (HVAC) transmission in terms of energy transportation cost.

The HVDC transmission is known as an appropriate method particularly for international power transaction (energy trade) in which countries may use different frequencies and voltages. Also, as it is demonstrated that the High Voltage Direct-Current (HVDC) transmission is much more economical than the High Voltage Alternating-Current (HVAC) transmission in terms of energy transportation cost even when an energy bottleneck phenomenon occurs due to the extensive energy consumption in downtowns that are densely populated areas, new attention is being given to the HVDC transmission.

Particularly, when solar energy and wind energy abundantly distributed in the African continent can be developed and transported to the European continent, the new and renewable energy share can be significantly increased in Europe. Thus, this technology is most developed in Europe. Also, the new and renewable energy market is being rapidly growing in China that needs to transport large-capacity hydroelectric power stations to large cities away therefrom by about 1,000 kilometers and can produce energy from deserts.

When the HVDC transmission systems are classified according to the type of the converter, the HVDC transmission systems may be classified into an HVDC transmission system having a current-type converter and an HVDC transmission system having a voltage-type converter. The present disclosure relates to a voltage-type converter, and more particularly, to a modular multi-level converter among the voltage-type converters.

In the modular multi-level converter, a unit submodule is manufactured using an Insulated Gate Bipolar Transistor (IGBT) with a low voltage specification, and the submodules are stacked in series to form a stack structure with a withstanding voltage ability with respect to a high voltage of hundreds of KVs. Also, the modular multi-level converter is allowed to have a variety of voltage levels according to the number of submodules stacked in series.

In addition, the modular multi-level converter can perform independent control of active power and reactive power which cannot be implemented in a HVDC transmission system having a current-type converter, and need not together supply reactive power corresponding to 50% of active power in order to transmit active power. Also, each of converters located at the both ends of a high DC voltage can be stably controlled without information on the counter converter, and the transportation direction of active power can be simply controlled by changing only the current direction without a process of re-determining the magnitude of voltages at the both ends.

However, due to its structure, the modular multi-level converter for the HVDC transmission has limitations that the current-type converter does not have.

In other words, since the capacity voltage in the submodule is not uniform and a resultant voltage of an upper valve voltage and a lower valve voltage is not the same as a DC link voltage, there are limitations in that a circulating current component flowing in the multi-level converter exists. Also, a harmonic may be induced in a high voltage DC-grid, or a harmonic is contained in active power of an Alternating Current (AC) grid.

In order to overcome these limitations, various methods have been proposed. However, when an accident such as one-phase earthed occurs, the AC-grid voltage becomes an unbalance voltage state. In this condition, the circulating current is not suppressed, or a harmonic is induced in the DC-grid. Also, a harmonic is contained in active power of the AC-grid, showing that the control characteristics are still not strong.

Also, a typical control method for the HVDC transmission system with a modular multi-level converter requires an upper controller to perform a large amount of operation, and is difficult to implement in a Valve Controller (VC). Accordingly, the typical control method for the HVDC transmission system is not suitable for improvement of the operation speed. Specifically, since a current reference value derived from an active and reactive power controller and a current reference value derived from a circulating current suppression controller use a phase current, or use an expression of the phase current transformed into a d-q coordinate plane, the typical control method is suitable to implement the controller by phase unit but is difficult to implement in each valve control, making it difficult to improve the operation speed.

(c) Prior Art

Non-Patent (Non-patent Document 2) A circulating current suppression method published by Qingrui Tu [IEEE Trans. on Power Delivery, vol. 26, 2011] discloses a method of suppressing a circulating current of a negative sequence component when references of the 3-phase voltage are compensated, using an output value that allows a d-axis circulating current component and a q-axis circulating current component rotating $-2\theta_S$ in a negative sequence order (R>T>S), not flowing into a phase of the AC system, flowing only between a upper valve controller and an lower valve controller of each phase, and expressed in a rotating coordinate system to become "0", where a circulating current has a frequency two times larger than a AC-grid frequency. However, this method is good in controller characteristics when the power system voltage is in 3-phase balance condition, but is not good in control characteristics when the system voltage is under an unbalance condition.

(Non-patent Document 3) FIG. 20 is a view illustrating a method proposed by Qingrui Tu, which shows one of typical circulating current suppression methods.

(Non-patent Document 4) A circulating current suppression method published by Qingrui Tu [IEEE Trans. on Power Delivery, vol. 27, 2012] can be used both when the system voltage is in 3-phase balance and when the system voltage is under the unbalance condition. He demonstrated that power of a zero sequence component is additionally generated in each valve when a modular multi-level converter for High Voltage Direct-Current (HVDC) transmission operates under 3-phase unbalance condition of the system voltage. In this method, the upper valve voltages and the lower valve voltages of each phase are added up, and then are divided by three to acquire an average component and define the average component as a zero sequence component of the circulating current. An intermediate compensation value for allowing the zero sequence component of the circulating current to become "0" is acquired by applying a resonant controller having a resonant frequency $2\omega_S$ at a branch. The intermediate compensation value is added to an output value for suppressing the negative sequence component to compensate for a phase voltage reference value (PWM input value). This method is shown in FIG. 4.

(Non-patent Document 5) However, although this method shows good characteristics in terms of proposing a method for suppressing both circulating current of the negative sequence component and circulating current of the zero-sequence component, the transient state characteristics are not good at a start point where unbalance occurs in the system voltage. Also, there is a complexity that can be implemented only when the positive sequence component, negative sequence component, and the zero-sequence component are all known. Particularly, there is a limitation in that a harmonic component in addition to a DC component is much included in a current waveform flowing on a high voltage DC line.

(Non-patent Document 6) FIG. 19 is a view illustrating another example of typical circulating current suppression methods, proposed by Antonios Anotonopoulos and Maryam Saeedifard. A region marked by a box shows a method proposed by Antonious Anotonopoulos, and the other region shows a method proposed by Maryam Saeedifard.

(Non-patent Document 7) When a typical method is analyzed in a structural aspect of algorithm, it cannot be seen that the algorithm configuration developed after Antonios Anotonopoulos [Power Electronics and Application, EPE '09, 2009] is focused on the implementation in a distributed control system. A current reference value is generated from an active power and reactive power controller, and then a phase voltage reference value is generated through a current controller that allows the current reference value to be converged. Thereafter, when a voltage component that suppresses an AC component of the circulating current is generated and compensated, voltage reference values with respect to each valve can be calculated. Accordingly, this method has a structure inappropriate to perform the control algorithm by using independent valve controller.

(Non-patent Document 8) The modular multi-level converter for the HVDC transmission system configures a current controller using a current flowing in each phase, performs a process of suppressing the circulating current, and then determines each valve voltage reference value. When the valve voltage reference value is determined, the number of submodules to be turned on/off for each valve is determined, and the submodule voltage is smoothed. This method was significantly developed by Antonios Antonopoulous (2009). Also, regarding the unbalanced system voltage condition as well, a current controlling method capable of effectively and quickly controlling the active power (or the DC_link constant voltage control) and the reactive power was greatly developed by Maryam Saeedifard (2010), which is shown in FIG. 19.

(Non-patent Document 9) FIG. 21 is a view illustrating a control device for implementing a variety of typical methods described above.

(Non-patent Document 10) In FIG. 21, every value includes an exclusive valve controller 2, and a station controller 1 is disposed over six valve controllers 2. FIG. 21 is a view illustrating an analysis of a roll allocation regarding a typical method. As shown in FIG. 21, there are many tasks for the station controller 1 to commonly perform and roles that the valve controller 2 independently performs are limited to a part of tasks. Accordingly, this structure is not appropriate for a distributed control system.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a driving apparatus and method for a modular multi-level converter, which can implement current control and circulating current suppression control using current flowing in six valves.

The present invention also provides a driving apparatus and method for a modular multi-level converter, which can perform distributed control through a parallel operation of each valve controller.

In one aspect, the present invention provides a driving method for a modular multi-level converter that converts an alternating current (AC) into a direct current (DC) or converts a DC into an AC using the modular multi-level converter with a plurality of submodules stacked to deliver power in an AC system, the modular multi-level converter comprising a plurality of valves independently driven and an upper valve that is one of valve branches comprising the valves, the method comprising: inputting a current reference value ($i^*_{pj2}$) of the upper valve of the modular multi-level converter; measuring a current value ($i_{pj2}$) of the valve; calculating an error value ($err_{pj2}$) between the current reference value and the measured current value of the upper valve; measuring a DC link voltage value ($V_{dc2}$) of the modular multi-level converter; measuring a AC-grid voltage value ($E_{sj}$) of the modular multi-level converter; and calculating a voltage reference value ($u^*_{pj2}$) using the current reference value ($i^*_{pj2}$), the measured current value ($i_{pj2}$), the error value ($err_{pj2}$), the DC link voltage value ($V_{dc2}$), and the AC-grid voltage value ($E_{sj}$).

In an exemplary embodiment, the driving method may further include calculating a parameter variation value ($\hat{l}_{pj2}$) of a circulating current suppression inductor of the modular multi-level converter between the measuring of the AC-grid voltage ($E_{sj}$) of the modular multi-level converter and calculating of the voltage reference value ($u^*_{pj2}$) using the current reference value, the measured current value, the error value, the DC link voltage value, and the system voltage value.

In another exemplary embodiment, the calculating of the parameter variation value ($\hat{l}_{pj2}$) of a circulating current suppression inductor of the modular multi-level converter may include: obtaining a differential value of the parameter variation value of the circulating current suppression inductor using the following equation:

$\dot{\hat{l}}_{pj2} = -m_1 err_{pj2}$; and integrating the differential value of the parameter variation value of the circulating current suppression inductor. Here, $m_1$ may be a predetermined tuning constant.

In still another exemplary embodiment, the calculating of the voltage reference value ($u^*_{pj2}$) using the current reference value ($i^*_{pj2}$), the measured current value ($i_{pj2}$), the error value ($err_{pj2}$), the DC link voltage value ($V_{dc2}$), the AC-grid voltage value ($E_{sj}$), and the parameter variation value ($\hat{l}_{pj2}$) of the circulating current suppression inductor may include calculating the voltage reference value (u*$_{pj2}$) using the following equation:

$$u^*_{pj2} = \left(\frac{V_{dc2}}{2} - E_{sj}\right) - \{P(err_{pj2}) + R_1(err_{pj2}) + R_2(err_{pj2})\} + \{L_s \hat{l}_{pj2}\}$$

In yet another exemplary embodiment, the calculating of the voltage reference value (u*$_{pj2}$) using the current reference value (i*$_{pj2}$), the measured current value (i$_{pj2}$), the error value (err$_{pj2}$), the DC link voltage value (V$_{dc2}$), the AC-grid voltage value (E$_{sj}$), and the parameter variation value ($\hat{l}_{pj2}$) of the circulating current suppression inductor may include calculating the voltage reference value (u*$_{pj2}$) using the following equation:

$$u^*_{pj2} = \left(\frac{V_{dc2}}{2} - E_{sj}\right) - \{P(err_{pj2}) + R_1(err_{pj2}) + R_2(err_{pj2})\} - \{L_s i^*_{pj2} - L_s \hat{l}_{pj2}\}$$

In still yet another exemplary embodiment, the calculating of the voltage reference value (u*$_{pj2}$) using the current reference value (i*$_{pj2}$), the measured current value (i$_{pj2}$), the error value (err$_{pj2}$), the DC link voltage value (V$_{dc2}$), and the AC-grid voltage value (E$_{sj}$) may include calculating the voltage reference value (u*$_{pj2}$) using the following equation:

$$u^*_{pj2} = \left(\frac{V_{dc2}}{2} - E_{sj}\right) - \{P(err_{pj2}) + R_1(err_{pj2}) + R_2(err_{pj2})\}.$$

In a further exemplary embodiment, the calculating of the voltage reference value (u*$_{pj2}$) using the current reference value (i*$_{pj2}$), the measured current value (i$_{pj2}$), the error value (err$_{pj2}$), the DC link voltage value (V$_{dc2}$), and the AC-grid voltage value (E$_{sj}$), an sgn function may include calculating the voltage reference value (u*$_{pj2}$) using the following equation:

$$u^*_{pj2} = \left(\frac{V_{dc2}}{2} - E_{sj}\right) - \{P(err_{pj2}) + R_1(err_{pj2}) + R_2(err_{pj2})\} - \{\rho_{pj2} sgn(err_{pj2})\}.$$

Here, the sign function may denote a sign function operated by the following equations:

$$sgn(err_{pj2})=1 (err_{pj2}>0)$$

$$sgn(err_{pj2})=0 (err_{pj2}\leq 0)$$

and $\rho_{pj2}$ may denote a proportional gain.

In another further exemplary embodiment, the calculating of the voltage reference value (u*$_{pj2}$) using the current reference value (i*$_{pj2}$), the measured current value (i$_{pj2}$), the error value (err$_{pj2}$), the DC link voltage value (V$_{dc2}$), the AC-grid voltage value (E$_{sj}$), and an sgn function may include calculating the voltage reference value (u*$_{pj2}$) using the following equation:

$$u^*_{pj2} = \left(\frac{V_{dc2}}{2} - E_{sj}\right) - \{P(err_{pj2}) + R_1(err_{pj2}) + R_2(err_{pj2})\} - \{\rho_{pj2} sgn(err_{pj2})\},$$

Here, the sign function may denote a sign function operated by the following equations:

$$sgn(err_{pj2})=1 (err_{pj2}>0)$$

$$sgn(err_{pj2})=0 (err_{pj2}\leq 0)$$

$\rho_{pj2}$ may denote a proportional gain. Also, $L_s$ may denote a circulating current suppression inductor of the upper valve.

In still another further exemplary embodiment, P(err$_{pj2}$), R$_1$(err$_{pj2}$), and R$_2$(err$_{pj2}$) may be calculated using the following equations:

$$P(err_{pj2}) = (K_p) err_{pj2}$$

$$R_1(err_{pj2}) = \left(\frac{K_{i1}s}{s^2 + (\omega_o)^2}\right) err_{pj2}, \text{ and}$$

$$R_2(err_{pj2}) = \left(\frac{K_{i2}s}{s^2 + (2\omega_o)^2}\right) err_{pj2}.$$

Here, $K_p$, $K_{i1}$, and $K_{i2}$ may denote predetermined gain values, and $\omega_o$ denotes a AC-grid frequency.

In yet another further exemplary embodiment, the inputting of the current reference value (i*$_{pj2}$) of the upper valve of the modular multi-level converter may include calculating the current reference value (i*$_{pj2}$) using the following equation:

$$i^*_{pj2} = \frac{i^*_{dc2}}{3} + \frac{i^*_{sj}}{2} \; (j = a, b, c),$$

and i*$_{dc2}$ may denote a DC current reference value flowing in a DC system and i*$_{sj}$ may denote a reference value regarding a phase current.

In still yet another further exemplary embodiment, the reference value regarding the phase current may be calculated into an expression of a stationary reference frame using the following equation:

$$\begin{bmatrix} i^*_{sa} \\ i^*_{sb} \\ i^*_{sc} \end{bmatrix} = \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} i^*_{s\alpha} \\ i^*_{s\beta} \end{bmatrix}.$$

Here, i*$_{s\alpha}$ and i*$_{s\beta}$ may denote the reference value regarding the phase current expressed into a rotating stationary reference frame.

In a still further exemplary embodiment, i*$_{s\alpha}$ and i*$_{s\beta}$ may convert an expression of the reference value regarding the phase current at a d-q frame into the rotating stationary reference frame using the following equation:

$$i^*_{s\alpha\beta} = i_{sdq}{}^{p*} e^{j\omega t} + i_{sdq}{}^{n*} e^{-j\omega t}$$

Here, $i_{sdq}{}^{p*}$ may be an abbreviation of a d-axis and a q-axis ($i_{sq}{}^{p*}$, $i_{sd}{}^{p*}$) of a positive sequence component current reference value; $i_{sdq}{}^{n*}$ may be an abbreviation of a d-axis and a q-axis ($i_{sq}{}^{n*}$, $i_{sd}{}^{n*}$) of a negative sequence component current reference value; $i_{sd}{}^{p*}$ may denote the d-axis of the positive sequence component current reference value; $i_{sq}{}^{p*}$ may denote the q-axis of the positive sequence component current reference value; $i_{sd}{}^{n*}$ may denote the d-axis of the negative sequence component current reference value; $i_{sq}{}^{n*}$ may denote the q-axis of the negative sequence component current reference value; $i_{sq}^{p*}$, $i_{sd}^{p*}$, $i_{sq}^{n*}$, and $i_{sd}^{n*}$ may be calculated using the following equations:

$$i_{sq}^{p*} = PI(P_s^* - P_s),$$

$$i_{sd}^{p*} = PI(Q_s^* - Q_s),$$

$$i_{sq}^{n*} = -\frac{E_{sd}^n}{E_{sq}^p} i_{sd}^p - \frac{E_{sq}^n}{E_{sq}^p} i_{sq}^p, \text{ and}$$

$$i_{sd}^{n*} = \frac{E_{sq}^n}{E_{sq}^p} i_{sd}^p - \frac{E_{sd}^n}{E_{sq}^p} i_{sq}^p.$$

Here, $P_s$ may denote active power in the AC system, $P_s^*$ may denote a reference value of active power in the AC system, $Q_s$ may denote reactive power in the AC system, $Q_s^*$ may denote a reference value of reactive power in the AC system, $E_{sd}^p$ may denote a d-axis voltage of a positive sequence voltage flowing in the AC system, $E_{sq}^p$ may denote a q-axis voltage of a positive sequence voltage flowing in the AC system, $E_{sd}^n$ may denote a d-axis voltage of a negative sequence voltage flowing in the AC system, and $E_{sq}^n$ may denote a q-axis voltage of a negative sequence voltage flowing in the AC system.

In a yet still further exemplary embodiment, the reference value ($i^*_{dc2}$) of the DC system may be calculated using the following equation.

$$i_{dc2}^* = \frac{3}{2}\left(\frac{E_{sq}^p}{V_{dc2}}\right) i_{sq}^{p*}.$$

Here, $E_{sq}^p$ may denote a q-axis voltage of a positive sequence component voltage flowing in the AC system and $i_{sq}^{p*}$ may denote a q-axis current of a positive sequence component current reference value flowing in the AC system.

In a yet still further exemplary embodiment, after the calculating of the voltage reference value ($u^*_{pj2}$) using the current reference value ($i^*_{pj2}$), the measured current value ($i_{pj2}$), the error value (err$_{pj2}$), the DC link voltage value ($V_{dc2}$), and the AC-grid voltage value ($E_{sj}$), the driving method may include: calculating the number of submodules to be triggered among submodules of the upper valve; selecting submodules corresponding to the number of submodules; and applying a pulse width modulation signal to the selected submodules.

In another aspect, the present invention provides a driving method for a modular multi-level converter that converts an alternating current (AC) into a direct current (DC) or converts a DC into an AC using the modular multi-level converter with a plurality of submodules stacked to deliver power in an AC system, the modular multi-level converter comprising a plurality of valves independently driven and a lower valve that is one of valve branches comprising the valves, the method comprising: inputting a current reference value ($i^*_{nj2}$) of the lower valve of the modular multi-level converter; measuring a current value ($i_{nj2}$) of the valve; calculating an error value (err$_{nj2}$) between the current reference value and the measured current value of the lower valve; measuring a DC link voltage value ($V_{dc2}$) of the modular multi-level converter; measuring a system voltage value ($E_{sj}$) of the modular multi-level converter; and calculating a voltage reference value ($u^*_{pj2}$) using the current reference value ($i^*_{nj2}$) the measured current value ($i_{nj2}$), the error value (err$_{nj2}$), the DC link voltage value ($V_{dc2}$), and the AC-grid voltage value ($E_{sj}$).

In an exemplary embodiment, the driving method may further include calculating a parameter variation value ($\hat{l}_{nj2}$) of a circulating current suppression inductor of the modular multi-level converter between the measuring of the AC-grid voltage value ($E_{sj}$) of the modular multi-level converter and calculating of the voltage reference value ($u^*_{nj2}$) using the current reference value, the measured current value, the error value, the DC link voltage value, and the system voltage value.

In another exemplary embodiment, the calculating of the parameter variation value ($\hat{l}_{nj2}$) of a circulating current suppression inductor of the modular multi-level converter may include: obtaining a differential value of the parameter variation value of the circulating current suppression inductor using the following equation:

$\dot{\hat{l}}_{nj2} = m_2 \text{err}_{nj2}$; and integrating the differential value of the parameter variation value of the circulating current suppression inductor. Here, $m_2$ may be a predetermined tuning constant.

In still another exemplary embodiment, the calculating of the voltage reference value ($u^*_{nj2}$) using the current reference value ($i^*_{nj2}$) the measured current value ($i_{nj2}$), the error value (err$_{nj2}$), the DC link voltage value ($V_{dc2}$), the AC-grid voltage value ($E_{sj}$), and the parameter variation value ($\hat{l}_{nj2}$) of the inductor may include calculating the voltage reference value ($u^*_{nj2}$) using the following equation:

$$u_{nj2}^* = \left(\frac{V_{dc2}}{2} + E_{sj}\right) - \{P(err_{nj2}) + R_1(err_{nj2}) + R_2(err_{nj2})\} + \{L_s \hat{l}_{nj2}\}.$$

In yet another exemplary embodiment, the calculating of the voltage reference value ($u^*_{nj2}$) using the current reference value ($i^*_{nj2}$), the measured current value ($i_{nj2}$), the error value (err$_{nj2}$), the DC link voltage value ($V_{dc2}$), the AC-grid voltage value ($E_{sj}$), and the parameter variation value ($\hat{l}_{nj2}$) of the inductor may include calculating the voltage reference value ($u^*_{nj2}$) using the following equation:

$$u_{nj2}^* = \left(\frac{V_{dc2}}{2} + E_{sj}\right) - \{P(err_{nj2}) + R_1(err_{nj2}) + R_2(err_{nj2})\} - \{L_s i_{nj2}^* - L_s \hat{l}_{nj2}\}.$$

In still yet another exemplary embodiment, the calculating of the voltage reference value ($u^*_{nj2}$) using the current reference value ($i^*_{nj2}$), the measured current value ($i_{nj2}$), the error value (err$_{nj2}$), the DC link voltage value ($V_{dc2}$), and the AC-grid voltage value ($E_{sj}$) may include calculating the voltage reference value ($u^*_{nj2}$) using the following equation:

$$u_{nj2}^* = \left(\frac{V_{dc2}}{2} + E_{sj}\right) - \{P(err_{nj2}) + R_1(err_{nj2}) + R_2(err_{nj2})\}.$$

In a further exemplary embodiment, the calculating of the voltage reference value ($u^*_{nj2}$) using the current reference value ($i^*_{nj2}$), the measured current value ($i_{nj2}$), the error value (err$_{nj2}$), the DC link voltage value ($V_{dc2}$), the AC-grid voltage value ($E_{sj}$), and an sgn function may include calculating the voltage reference value ($u^*_{nj2}$) using the following equation:

$$u_{nj2}^* = \left(\frac{V_{dc2}}{2} + E_{sj}\right) - \{P(err_{nj2}) + R_1(err_{nj2}) + R_2(err_{nj2})\} - \{\rho_{nj2} sgn(err_{nj2})\}.$$

Here, the sign function may denote a sign function operated by the following equations:

$$\text{sgn}(err_{nj2})=1(err_{nj2}>0)$$

$$\text{sgn}(err_{nj2})=0(err_{nj2}\leq 0)$$

and $\rho_{pj2}$ may denote a proportional gain.

In another further exemplary embodiment, the calculating of the voltage reference value ($u^*_{nj2}$) using the current reference value ($i^*_{nj2}$), the measured current value ($i_{nj2}$), the error value ($err_{nj2}$), the DC link voltage value ($V_{dc2}$), the AC-grid voltage value ($E_{sj}$), and an sgn function may include calculating the voltage reference value ($u^*_{nj2}$) using the following equation:

$$u^*_{nj2} = \left(\frac{V_{dc2}}{2} + E_{sj}\right) -$$
$$\{P(err_{nj2}) + R_1(err_{nj2}) + R_2(err_{nj2})\} - \left\{L_s \dot{i}^{r*}_{nj2} + \rho_{nj2}\text{sgn}(err_{nj2})\right\},$$

Here, the sign function denotes a sign function operated by the following equations:

$$\text{sgn}(err_{nj2})=1(err_{nj2}>0)$$

$$\text{sgn}(err_{nj2})=0(err_{nj2}\leq 0)$$

$\rho_{nj2}$ may denote a proportional gain; and $L_s$ may denote a circulating current suppression inductor of the upper valve.

In still another further exemplary embodiment, $P(err_{nj2})$, $R_1(err_{nj2})$, and $R_2(err_{nj2})$ may be calculated using the following equations:

$$P(err_{nj2}) = (K_p)err_{nj2},$$

$$R_1(err_{nj2}) = \left(\frac{K_{i1}s}{s^2 + (\omega_o)^2}\right)err_{nj2}, \text{ and}$$

$$R_2(err_{nj2}) = \left(\frac{K_{i2}s}{s^2 + (2\omega_o)^2}\right)err_{nj2}.$$

Here, $K_p$, $K_{i1}$, and $K_{i2}$ may denote predetermined gain values, and $\omega_o$ may denote a AC-grid frequency.

In yet another further exemplary embodiment, the inputting of the current reference value ($i^*_{nj2}$) of the upper valve of the modular multi-level converter may include calculating the current reference value ($i^*_{nj2}$) using the following equation:

$$i^*_{nj2} = \frac{i^*_{dc2}}{3} - \frac{i^*_{sj}}{2}.$$

Here, $i^*_{dc2}$ may denote a DC current reference value flowing in a DC system and $i^*_{sj}$ may denote a reference value regarding a phase current.

In still yet another further exemplary embodiment, the reference value regarding the phase current may be calculated into an expression of a stationary reference frame using the following equation:

$$\begin{bmatrix} i^*_{sa} \\ i^*_{sb} \\ i^*_{sc} \end{bmatrix} = \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} i^*_{s\alpha} \\ i^*_{s\beta} \end{bmatrix},$$

and $i^*_{s\alpha}$ and $i^*_{s\beta}$ may denote the reference value regarding the phase current expressed into a rotating stationary reference frame.

In a still further exemplary embodiment, $i^*_{s\alpha}$ and $i^*_{s\beta}$ may convert an expression of the reference value regarding the phase current at a d-q frame into the rotating stationary reference frame using the following equation:

$$i^*_{s\alpha\beta} = i^{p*}_{sdq} e^{j\omega t} i^{n*}_{sdq} e^{-j\omega t};$$

$i^{p*}_{sdq}$ may be an abbreviation of a d-axis and a q-axis ($i^{p*}_{sq}$, $i^{p*}_{sd}$) of a positive sequence component current reference value; $i^{n*}_{sdq}$ may be an abbreviation of a d-axis and a q-axis ($i^{n*}_{sq}$, $i^{n*}_{sd}$) of a negative sequence component current reference value; $i^{p*}_{sd}$ may denote the d-axis of the positive sequence component current reference value; $i^{p*}_{sq}$ may denote the q-axis of the positive sequence component current reference value; $i^{n*}_{sd}$ may denote the d-axis of the negative sequence component current reference value; $i^{n*}_{sq}$ may denote the q-axis of the negative sequence component current reference value; $i^{p*}_{sq}$, $i^{p*}_{sd}$, $i^{n*}_{sq}$, and $i^{n*}_{sd}$ may be calculated using the following equations:

$$i^{p*}_{sq} = PI(P^*_s - P_s),$$

$$i^{p*}_{sd} = PI(Q^*_s - Q_s),$$

$$i^{n*}_{sq} = -\frac{E^n_{sd}}{E^p_{sq}}i^p_{sd} - \frac{E^n_{sq}}{E^p_{sq}}i^p_{sq}, \text{ and}$$

$$i^{n*}_{sd} = \frac{E^n_{sq}}{E^p_{sq}}i^p_{sd} - \frac{E^n_{sd}}{E^p_{sq}}i^p_{sq}.$$

Here, $P_s$ may denote active power in the AC system, $P^*_s$ may denote a reference value of active power in the AC system, $Q_s$ may denote reactive power in the AC system, $Q^*_s$ may denote a reference value of reactive power in the AC system, $E^p_{sd}$ may denote a d-axis voltage of a positive sequence voltage flowing in the AC system, $E^p_{sq}$ may denote a q-axis voltage of a positive sequence voltage flowing in the AC system, $E^n_{sd}$ may denote a d-axis voltage of a negative sequence voltage flowing in the AC system, and $E^n_{sq}$ may denote a q-axis voltage of a negative sequence voltage flowing in the AC system.

In a yet still further exemplary embodiment, the reference value ($i^*_{dc2}$) of the DC system may be calculated using the following equation:

$$i^*_{dc2} = \frac{3}{2}\left(\frac{E^p_{sq}}{V_{dc2}}\right)i^{p*}_{sq},$$

and

Here, $E^p_{sq}$ may denote a q-axis voltage of a positive sequence component voltage flowing in the AC system and $i^{p*}_{sq}$ may denote a q-axis current of a positive sequence component current reference value flowing in the AC system.

In a yet still further exemplary embodiment, after the calculating of the voltage reference value ($u^*_{pj2}$) using the current reference value ($i^*_{pj2}$), the measured current value ($i_{pj2}$), the error value ($err_{pj2}$), the DC link voltage value ($V_{dc2}$), and the AC-grid voltage value ($E_{sj}$), the driving method may include: calculating the number of submodules to be triggered among submodules of the upper valve; selecting submodules corresponding to the number of submodules; and applying a pulse width modulation signal to the selected submodules.

In a yet still further exemplary embodiment, the driving method for the modular multi-level converter may be driven at a valve unit of the modular multi-level converter.

In still another aspect, the present invention provides a driving apparatus for a modular multi-level converter, including: an input unit receiving a current reference value of an upper valve of one valve branch of the modular multi-level converter; a current measuring unit for measuring a current value of the upper valve of the modular multi-level converter; a direct current (DC) link voltage measuring unit for measuring a voltage value of a DC link of the modular multi-level converter; a system voltage measuring unit for measuring a system voltage value of the modular multi-level converter; an error calculating unit for calculating an error value between the current reference value received by the input unit and the current value measured by the current measuring unit; a proportional controller proportionally amplifying the error value calculated by the error calculating unit; a first resonant-type current controller receiving the error value calculated by the error calculating unit to converge an error current equal to a AC-grid frequency to zero; a second resonant-type current controller receiving the error value calculated by the error calculating unit to converge a harmonic error current about two times larger than the AC-grid frequency to zero; and a voltage reference value calculating unit for calculating a voltage reference value of the upper valve of the one valve branch of the modular multi-level converter using the values calculated by the DC link voltage measuring unit, the system voltage measuring unit, the proportional controller, the first resonant-type current controller, and the second resonant-type current controller.

In an exemplary embodiment, the driving apparatus may further include: a submodule selecting unit for selecting the number of submodules to be triggered and the submodules to be triggered, using the voltage reference value calculated by the voltage reference value calculating unit; and a pulse width modulation signal generating unit applying a pulse width modulation signal to the submodules selected by the submodule selecting unit.

In another exemplary embodiment, the proportional controller may amplify the error value calculated by the error calculating unit to a gain value.

In still another exemplary embodiment, the first resonant-type current controller may multiply the error value calculated by the error calculating unit and the following equation:

$$\frac{K_{i1}s}{s^2 + (\omega_o)^2}$$

to converge the error current to zero.

Here, $K_{i1}$ denotes a predetermined gain value of the first resonant-type current controller and $\omega_o$ may denote the AC-grid frequency.

In yet another exemplary embodiment, the second resonant-type current controller may multiply the error value calculated by the error calculating unit and the following equation:

$$\frac{K_{i2}s}{s^2 + (2\omega_o)^2}$$

to converge the harmonic error current about two times larger than the AC-grid frequency to zero.

Here, $K_{i2}$ may denote a predetermined gain value of the second resonant-type current controller and $\omega_o$ may denote the AC-grid frequency.

In still yet another exemplary embodiment, the voltage reference value calculating unit may obtain a voltage difference by subtracting the AC-grid voltage value measured by the system voltage measuring unit from a half of the voltage value measured by the DC link voltage measuring unit, and may calculate the voltage reference value by subtracting a sum of the calculated values outputted by the proportional controller, the first resonant-type current controller, and the second resonant-type current controller from the voltage difference.

In a further exemplary embodiment, the driving apparatus may further include a compensator reducing an error generated from the modular multi-level converter. Here, the compensator may obtain an sgn output value by inputting the error value of the error calculating unit into an sgn function and then calculate a compensation value by multiplying the sgn output value and a proportional gain of the sgn function, and the sgn function is a sign function.

In another further exemplary embodiment, the voltage reference value calculating unit further may receive an output value of the compensator to obtain a voltage difference by subtracting the AC-grid voltage value measured by the system voltage measuring unit from a half of the voltage value measured by the DC link voltage measuring unit, and calculate the voltage reference value by subtracting a sum of the calculated values outputted by the proportional controller, the first resonant-type current controller, the second resonant-type current controller, and the compensator from the voltage difference.

In still another further exemplary embodiment, the driving apparatus may further include an estimator that obtains a variation estimation value by multiplying and integrating the error value calculated by the error calculating unit and a predetermined tuning constant to remove dynamic characteristics due to a variation of circulating current suppression inductor and resistor components of the modular multi-level converter.

In yet another further exemplary embodiment, the voltage reference value calculating unit may further receive an estimation value of the estimator to obtain a voltage difference by subtracting the AC-grid voltage value measured by the system voltage measuring unit from a half of the voltage value measured by the DC link voltage measuring unit, and calculate the voltage reference value by subtracting a sum of the calculated values outputted by the proportional controller, the first resonant-type current controller, the second resonant-type current controller, the compensator, and the estimator from the voltage difference.

In a further aspect, the present invention provides a driving apparatus for a modular multi-level converter, including: an input unit receiving a current reference value of a lower valve of one valve branch of the modular multi-level converter; a current measuring unit for measuring a current value of the lower valve of the modular multi-level converter; a direct current (DC) link voltage measuring unit for measuring a voltage value of a DC link of the modular multi-level converter; a system voltage measuring unit for measuring a system voltage value of the modular multi-level converter; an error calculating unit for calculating an error value between the current reference value received by the input unit and the current value measured by the current measuring unit; a proportional controller proportionally amplifying the error value calculated by the error calculating unit; a first resonant-type current controller receiving the error value calculated by the error calculating unit to converge an error current equal to a AC-grid frequency to zero; a second resonant-type current controller receiving the error value calculated by the error calculating unit to converge a harmonic error current about two times larger than the AC-grid frequency to zero; and a voltage reference value calculating unit for calculating a voltage reference value of the lower valve of the one valve branch of the modular multi-level converter using the values calculated by the DC link voltage measuring unit, the system voltage measuring unit, the proportional controller, the first resonant-type current controller, and the second resonant-type current controller.

In an exemplary embodiment, the driving apparatus may further include: a submodule selecting unit for selecting the number of submodules to be triggered and the submodules to be triggered, using the voltage reference value calculated by the voltage reference value calculating unit; and a pulse width modulation signal generating unit applying a pulse width modulation signal to the submodules selected by the submodule selecting unit.

In another exemplary embodiment, the proportional controller may amplify the error value calculated by the error calculating unit to a gain value.

In still another exemplary embodiment, the first resonant-type current controller may multiply the error value calculated by the error calculating unit and the following equation:

$$\frac{K_{i1}s}{s^2 + (\omega_o)^2}$$

to converge the error current to zero.

Here, $K_{i1}$ may denote a predetermined gain value of the first resonant-type current controller and $\omega_o$ denotes the AC-grid frequency.

The driving apparatus of claim 40, wherein the second resonant-type current controller may multiply the error value calculated by the error calculating unit and the following equation:

$$\frac{K_{i2}s}{s^2 + (2\omega_o)^2}$$

to converge the harmonic error current about two times larger than the AC-grid frequency to zero.

Here, $K_{i2}$ may denote a predetermined gain value of the second resonant-type current controller and $\omega_o$ may denote the AC-grid frequency.

In yet another exemplary embodiment, the voltage reference value calculating unit may obtain a voltage sum by adding the AC-grid voltage value measured by the system voltage measuring unit to a half of the voltage value measured by the DC link voltage measuring unit, and calculate the voltage reference value by subtracting a sum of the calculated values outputted by the proportional controller, the first resonant-type current controller, and the second resonant-type current controller from the voltage sum.

In still yet another exemplary embodiment, the driving apparatus may further include a compensator reducing an error generated from the modular multi-level converter. Here, the compensator may obtain an sgn output value by inputting the error value of the error calculating unit into an sgn function and then calculate a compensation value by multiplying the sgn output value and a proportional gain of the sgn function, and the sgn function may be a sign function.

In a further exemplary embodiment, the voltage reference value calculating unit may further receive an output value of the compensator to obtain a voltage sum by adding the AC-grid voltage value measured by the system voltage measuring unit to a half of the voltage value measured by the DC link voltage measuring unit, and calculate the voltage reference value by subtracting a sum of the calculated values outputted by the proportional controller, the first resonant-type current controller, the second resonant-type current controller, and the compensator from the voltage sum.

In another further exemplary embodiment, the driving apparatus may further include an estimator that obtains a variation estimation value by multiplying and integrating the error value calculated by the error calculating unit and a predetermined constant to remove dynamic characteristics due to a variation of circulating current suppression inductor and resistor components of the modular multi-level converter.

In still another further exemplary embodiment, the voltage reference value calculating unit may further receive an estimation value of the estimator to obtain a voltage sum by adding the AC-grid voltage value measured by the system voltage measuring unit to a half of the voltage value measured by the DC link voltage measuring unit, and calculate the voltage reference value by subtracting a sum of the calculated values outputted by the proportional controller, the first resonant-type current controller, the second resonant-type current controller, the compensator, and the estimator from the voltage sum.

In yet another further exemplary embodiment, the driving apparatus for the modular multi-level converter may be driven at a valve unit of the modular multi-level converter.

Other aspects and exemplary embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein:

FIG. 16 is a view illustrating values of parameters to be used in a driving apparatus and method for a modular multi-level converter according to an exemplary embodiment of the present invention;

Figure 1:
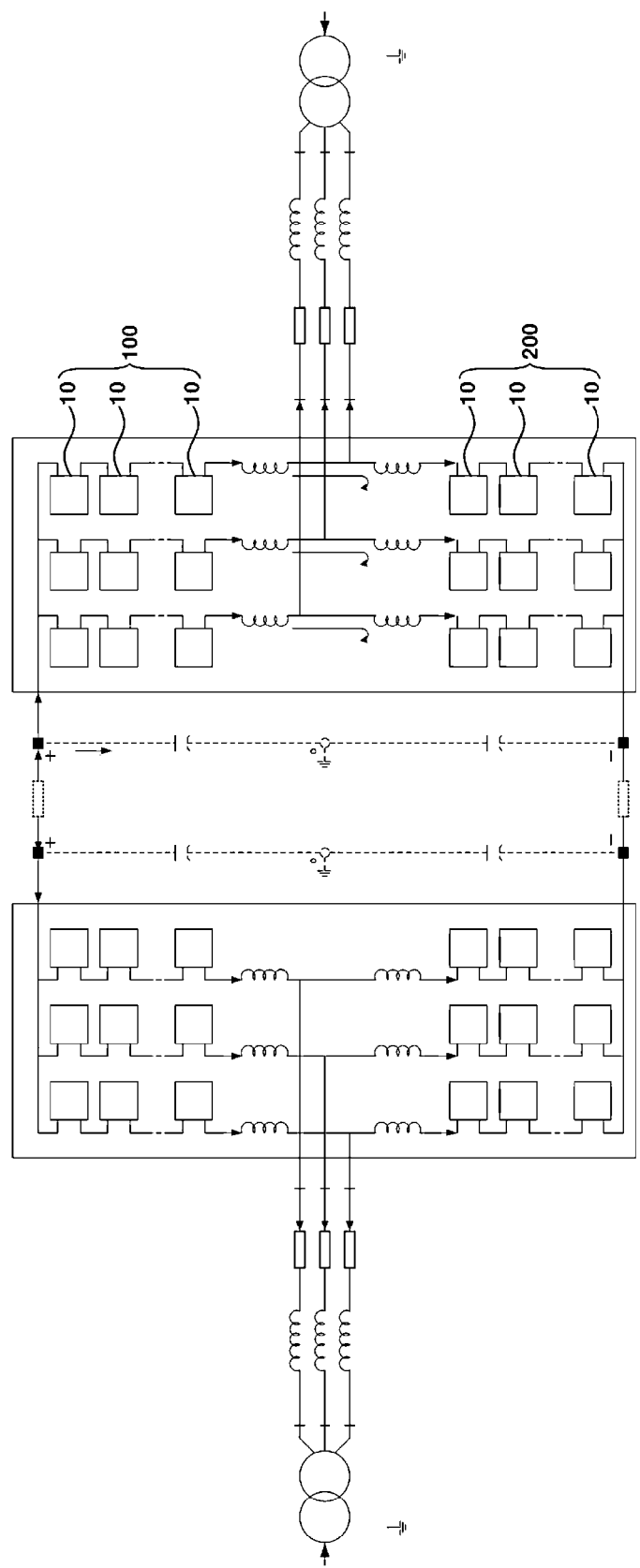
FIG. 1 is a view illustrating a configuration of a High Voltage Direct-Current (HVDC) transmission system to which a driving method of a modular multi-level converter is applied according to an exemplary embodiment of the present invention.

Reference numerals set forth in the Drawings includes reference to the following elements as further discussed below:

1: upper controller
2: valve controller
10: submodule
20: driving apparatus for modular multi-level converter
21: proportional controller
22: first resonant-type current controller
23: second resonant-type current controller
24: compensator
25: estimator
30: upper controller
100: upper valve
200: lower valve It should be understood that the accompanying drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The above and other features of the invention are discussed infra.

Hereinafter, exemplary embodiments of the present invention will be described in detail with reference to the accompanying drawings so that those skilled in the art can easily carry out the present invention.

FIG. 1 is a view illustrating a configuration of a High Voltage Direct-Current (HVDC) transmission system to which a driving method of a modular multi-level converter is applied according to an exemplary embodiment of the present invention.

An HVDC system with a modular multi-level converter may include multi-level converters MMC_1 and MMC_2 at both ends thereof across a high voltage direct current (DC) line. The multi-level converter may have a structure that is connected to a 3-phase alternating current (AC) system.

Also, each phase may include an upper valve 100 and a lower valve 200, and may include an upper valve controller for controlling the upper valve 100 and a lower valve controller for controlling the lower valve 200.

Figure 2:
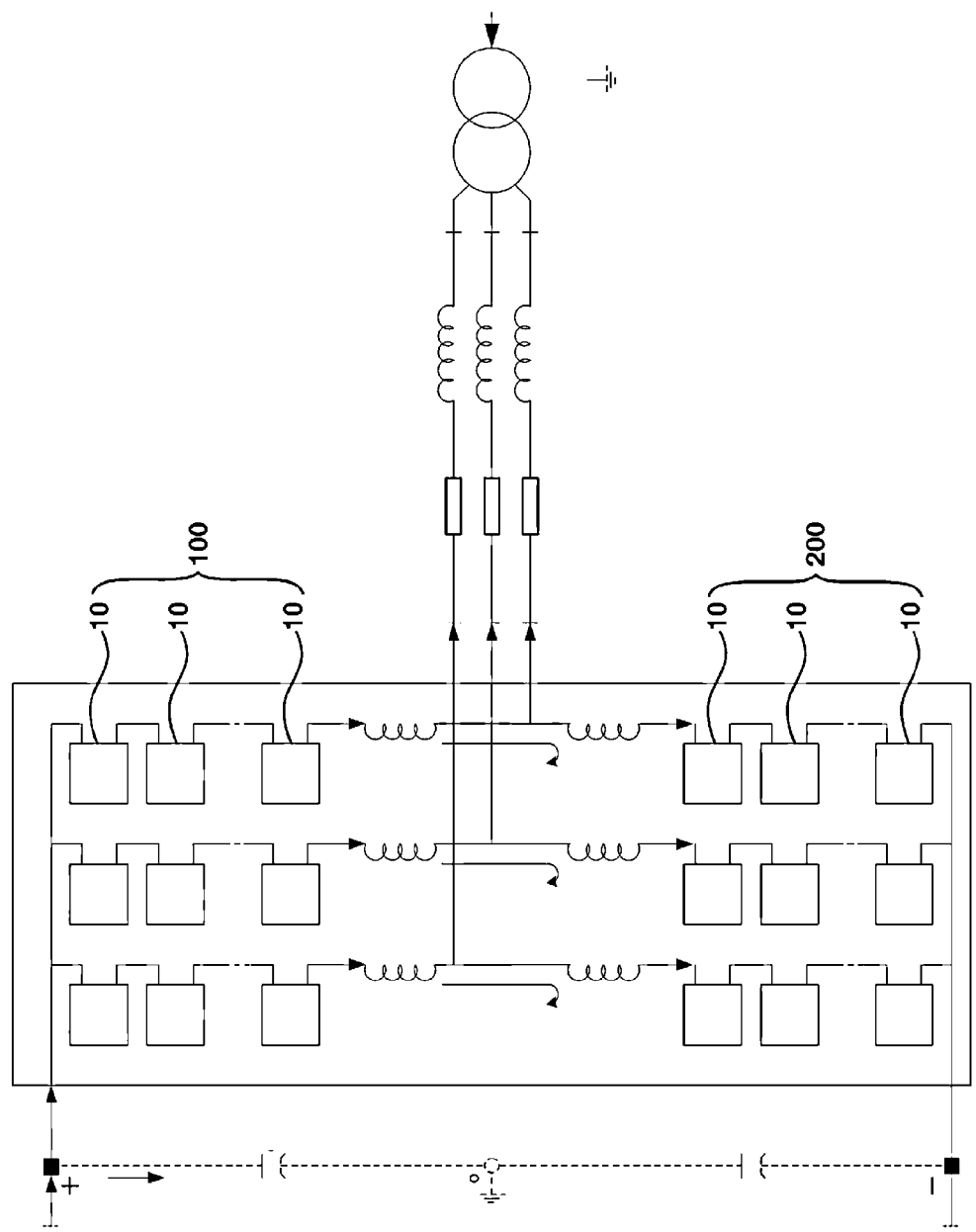
FIG. 2 is a view illustrating one of multi-level converters to which a driving method of a modular multi-level converter is applied according to an exemplary embodiment of the present invention, where the multi-level converters at both ends are bilaterally symmetrically disposed across a high voltage DC line.

FIG. 2 is a view illustrating one of multi-level converters to which a driving method of a modular multi-level converter is applied according to an exemplary embodiment of the present invention, where the multi-level converters at both ends are bilaterally symmetrically disposed across a high voltage DC line.

Figure 3:
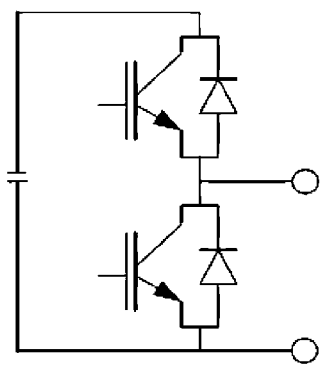
FIG. 3 is a view illustrating types of submodules that can be applied to a driving apparatus and method for a modular multi-level converter according to an exemplary embodiment of the present invention.
Figure 3:
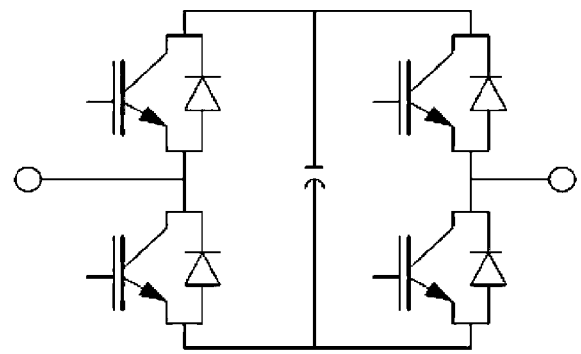
Figure 3:
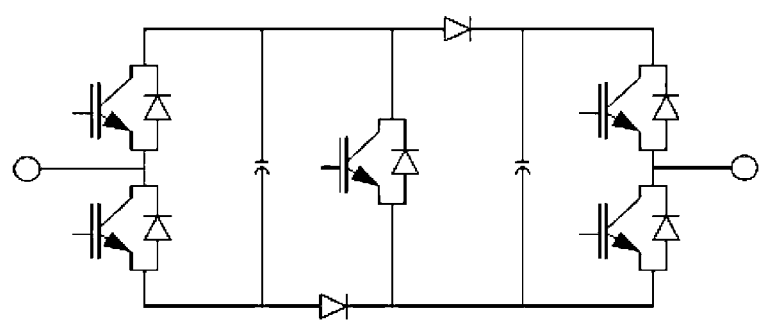

FIG. 3 is a view illustrating types of submodules 10 that can be applied to a driving apparatus and method for a modular multi-level converter according to an exemplary embodiment of the present invention.

FIG. 3A shows a half bridge type submodule, and FIG. 3B shows a full bridge type submodule. Also, FIG. 3C shows a clamp double type submodule.

Submodules of a driving apparatus for a modular multi-level converter according to an exemplary embodiment of the present invention may include the above-mentioned submodules, but the present invention is not limited thereto. Accordingly, it can be easily understood by those skilled in the art that various types of submodules can be used as the submodules.

First, in order to described an operational process of a driving apparatus and method for a modular multi-level converter according to an exemplary embodiment of the present invention, a voltage equation of a valve branch at one side of the modular multi-level converter will be deduced.

Figure 4:
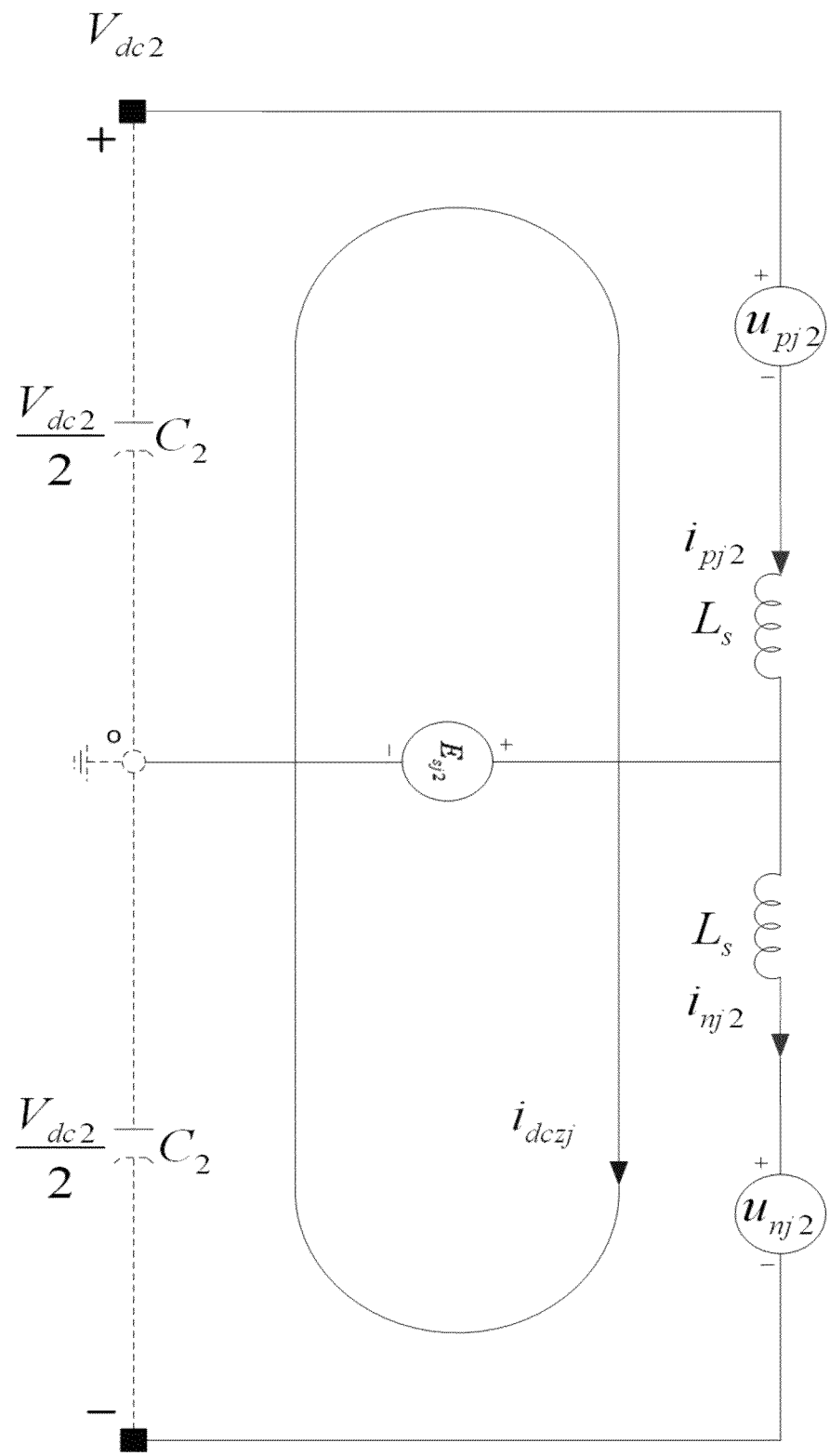
FIG. 4 is a view illustrating an equivalent circuit with respect to a valve branch taking charge of one phase in a multi-level converter to which a driving method for a modular multi-level converter is applied according to an exemplary embodiment of the present invention.

FIG. 4 is a view illustrating an equivalent circuit with respect to a valve branch taking charge of one phase in a multi-level converter to which a driving method for a modular multi-level converter is applied according to an exemplary embodiment of the present invention. Here, the valve branch refers to all upper and lower valves of the modular multi-level converter which take charge of one phase.

When a capacitor voltage at the upper valve of the multi-level converter is $v_{cpj}$ (j=a,b,c), a capacitor voltage at the lower valve of the multi-level converter is $v_{cnj}$ (j=a,b,c), a circulating current suppression inductor is $L_s$, and a resistance of an inductor and a cable is $R_s$, an equivalent circuit of one phase of the modular multi-level converter of FIGS. 1 and 2 can be represented like FIG. 4.

From two closed loops in which an upper valve current $(i_{pj2}$: j=a,b,c) and a lower valve current $(i_{nj2})$ flow, a voltage equation of the upper valve $(v_{pj}$: j=a,b,c) and a voltage equation of the lower valve $(v_{nj})$ can be expressed as Equations (1) and (2) below.

$$u_{pj2} + R_s i_{pj2} + L_s \frac{di_{pj2}}{dt} + E_{sj} - \frac{V_{dc2}}{2} = 0 \tag{1}$$

$$u_{nj2} + R_s i_{nj2} + L_s \frac{di_{nj2}}{dt} - \frac{V_{dc2}}{2} - E_{sj} = 0 \tag{2}$$

Here, the first term of Equation (1) may represent the sum $(u_{pj2})$ of the capacitor voltages of the upper valve, and the first term of Equation (2) may represent the sum $(u_{nj2})$ of the capacitor voltages of the lower valve. In Equations (1) and (2), $R_s$ may represent resistance values (not shown) of the upper valve and the lower valve of the modular multi-level converter.

$$u_{pj2} \triangleq \sum_{i=1}^{N_{pj2}} (v_{Cpji}) \tag{3}$$

$$u_{nj2} \triangleq \sum_{i=1}^{N_{nj2}} (v_{Cnji}) \tag{4}$$

If Equations (1) and (2) are transformed into a state equation with respect to the upper valve current $(i_{pj2})$ and the lower valve current $(i_{nj2})$, Equations (5) and (6) can be obtained.

$$\frac{di_{pj2}}{dt} = -\frac{R_s}{L_s} i_{pj2} + \frac{1}{L_s}\left\{\frac{V_{dc2}}{2} - u_{pj2}\right\} - \frac{1}{L_s} E_{sj} \tag{5}$$

$$\frac{di_{nj2}}{dt} = -\frac{R_s}{L_s} i_{nj2} + \frac{1}{L_s}\left(\frac{V_{dc2}}{2} - u_{nj2}\right) + \frac{1}{L_s} E_{sj} \tag{6}$$

The circulating current suppression inductor $L_s$ and resistor $R_s$ included in the state equations (5) and (6) may have nominal values, which may be considered to be varied by the manufacturing error and the temperature within a certain range. All terms related to a parameter variation term may be expressed into a lumped uncertainly term.

Then, when the parameter variation term included in the upper valve current $(i_{pj2})$ state equation is defined as $i_{pj2}$, and the parameter variation term included in the lower valve current $(i_{nj2})$ state equation is defined as $i_{nj2}$, Equations (5) and (6) may be generalized as follows.

$$\frac{di_{pj2}}{dt} = -\frac{R_s}{L_s} i_{pj2} + \frac{1}{L_s}\left\{\frac{V_{dc2}}{2} - u_{pj2}\right\} - \frac{1}{L_s} E_{sj} + l_{pj2} \tag{7}$$

$$\frac{di_{nj2}}{dt} = -\frac{R_s}{L_s} i_{nj2} + \frac{1}{L_s}\left(\frac{V_{dc2}}{2} - u_{nj2}\right) + \frac{1}{L_s} E_{sj} + l_{nj2} \tag{8}$$

An error between the reference value $(i^*_{pj2})$ of the upper valve current and the upper valve current $(i_{pj2})$ may be defined as $\text{err}_{pj2}$, and an error between the reference value $(i^*_{nj2})$ of the lower valve current and the lower valve current $(i_{nj2})$ may be defined as $\text{err}_{nj2}$.

$$\text{err}_{pj2} = i^*_{pj2} - i_{pj2} \tag{9}$$

$$\text{err}_{nj2} = i^*_{nj2} - i_{nj2} \tag{10}$$

If Equations (9) and (10) are differentiated and then substituted with Equations (7) and (8), Equations (11) and (12) can be obtained regarding a differential equation with respect to a quintic equation.

$$e\dot{r}r_{pj2} = \dot{i}^*_{pj2} - \left(-\frac{R_s}{L_s} i_{pj2} + \frac{1}{L_s}\left(\frac{V_{dc2}}{2} - u_{pj2}\right) - \frac{1}{L_s} E_{sj} + l_{pj2}\right) \tag{11}$$

$$e\dot{r}r_{nj2} = \dot{i}^*_{nj2} - \left(-\frac{R_s}{L_s} i_{nj2} + \frac{1}{L_s}\left(\frac{V_{dc2}}{2} - u_{nj2}\right) + \frac{1}{L_s} E_{sj} + l_{nj2}\right) \tag{12}$$

In a driving apparatus and method for a modular multi-level converter according to an exemplary embodiment of the present invention, a voltage reference value of the upper valve and a voltage reference value of the lower valve that are control inputs may be derived from a state equation using an upper valve voltage equation and a lower valve voltage equation and a backstepping control method.

The Lyapunov function that is selected to design a controller based on the backstepping control method may be expressed as Equation (13) below.

$$V_1 = \tfrac{1}{2}\text{err}^2_{pj2} + \tfrac{1}{2}\text{err}^2_{nj2} \tag{13}$$

In the driving apparatus and method for the modular multi-level converter according to the exemplary embodiment of the present invention, when the control input can be determined such that the differentiation of the Lyapunov function is smaller than "0", the upper valve current ($i_{pj2}$) may be controlled to be the same as the reference value ($i^*_{pj2}$) of the upper valve current, and simultaneously the lower valve current ($i_{nj2}$) may be controlled to be the same as the reference value ($i^*_{nj2}$) of the lower valve current.

Thus, if the differentiation is performed on the Lyapunov function expressed as Equation (13) and then substituted with Equations (11) and (12), Equation (14) can be obtained.

$$\dot{V}_1 = err_{pj2}\left\{i'^*_{pj2} - \left(-\frac{R_s}{L_s}i_{pj2} + \frac{1}{L_s}\left(\frac{V_{dc2}}{2} - u_{pj2}\right) - \frac{1}{L_s}E_{sj} + l_{pj2}\right)\right\} + \\ err_{nj2}\left\{i'^*_{nj2} - \left(-\frac{R_s}{L_s}i_{nj2} + \frac{1}{L_s}\left(\frac{V_{dc2}}{2} - u_{nj2}\right) + \frac{1}{L_s}E_{sj} + l_{nj2}\right)\right\} \quad (14)$$

In order to allow Equation (14) that is a differentiation of the Lyapunov function to always have a negative value, the upper valve voltage ($u_{pj2}$) the lower valve voltage ($u_{nj2}$) may be selected as Equations (15) and (16) below.

$$u_{pj2} = \left(\frac{V_{dc2}}{2} - E_{sj}\right) - \left\{(K_{pj2}err_{pj2} + R_s i_{pj2}) + L_s i'^*_{pj2} - L_s l_{pj2}\right\} \quad (15)$$

$$u_{nj2} = \left(\frac{V_{dc2}}{2} + E_{sj}\right) - \left\{(K_{nj2}err_{nj2} + R_s i_{nj2}) + L_s i'^*_{nj2} - L_s l_{nj2}\right\}. \quad (16)$$

However, since a parameter variation term that is an unknown value is included in Equations (15) and (16), Equations (15) and (16) cannot be directly used to determine a control law. Accordingly, since a parameter variation results in occurrence of an error, the driving apparatus and method for the modular multi-level converter according to the exemplary embodiment of the present invention may include a compensator that compensate for the parameter variation in order to inhibit the occurrence of the error. This compensator can be expressed as Equations (17) and (18) introduced with a sgn function.

$$L_s l_{pj2} = -\rho_{pj2}\,\text{sgn}(err_{pj2}) \quad (17)$$

$$L_s l_{nj2} = -\rho_{nj2}\,\text{sgn}(err_{nj2}) \quad (18)$$

Equations (15) and (16) can be rearranged into Equations (19) and (20) using the compensator regarding the parameter variation term.

$$u_{pj2} = \left(\frac{V_{dc2}}{2} - E_{sj}\right) - \left\{(K_{pj2}err_{pj2} + R_s i_{pj2}) + L_s i'^*_{pj2} + \rho_{pj2}\,\text{sgn}(err_{pj2})\right\} \quad (19)$$

$$u_{nj2} = \left(\frac{V_{dc2}}{2} + E_{sj}\right) - \left\{(K_{nj2}err_{nj2} + R_s i_{nj2}) + L_s i'^*_{nj2} + \rho_{nj2}\,\text{sgn}(err_{nj2})\right\}. \quad (20)$$

A current corresponding to a half of an AC phase current and a current corresponding to a third of a DC current flowing in a DC link voltage, and a circulating current of an AC component flowing between valves may coexist in the upper valve and the lower valve. The current corresponding to the half of the AC phase current may be a component that has a AC-grid frequency ($\omega_0$) as a basic frequency, and the AC component of the circulating current may be a component that has a frequency 2 two times larger than the AC-grid frequency.

Accordingly, the driving apparatus and method for the modular multi-level converter according to the exemplary embodiment of the present invention may include a proportional controller 21 and a first resonant-type current controller 22, which may control active power and reactive power (or DC link voltage control and reactive power) of the AC-grid frequency component (basic frequency) included in the upper valve current and the lower valve current.

Also, since the frequency component two times larger than the AC-grid frequency included in the upper valve current and the lower valve current is a component that cannot contribute to the transmission of energy, the frequency component needs to be removed. Accordingly, the driving apparatus and method for the modular multi-level converter according to the exemplary embodiment of the present invention may further include a second resonant-type current controller 23 to remove the frequency component.

Thus, the upper valve voltage reference value ($u^*_{pj2}$) and the lower valve voltage reference value ($u^*_{nj2}$) can be expressed as Equations (21) and (22).

$$u^*_{pj2} = \left(\frac{V_{dc2}}{2} - E_{sj}\right) - \\ \{P(err_{pj2}) + R_1(err_{pj2}) + R_2(err_{pj2})\} - \left\{L_s i'^*_{pj2} + \rho_{pj2}\,\text{sgn}(err_{pj2})\right\} \quad (21)$$

$$u^*_{nj2} = \left(\frac{V_{dc2}}{2} + E_{sj}\right) - \\ \{P(err_{nj2}) + R_1(err_{nj2}) + R_2(err_{nj2})\} - \left\{L_s i'^*_{nj2} + \rho_{nj2}\,\text{sgn}(err_{nj2})\right\} \quad (22)$$

Here, P ( ) may indicate the proportional controller 21. Also, R1 ( ) may indicate the first resonant-type current controller 22 having resonance characteristics at the AC-grid frequency, and R2 ( ) may indicate the second resonant-type current controller 23 having resonance characteristics at a frequency two times larger than the AC-grid frequency so as to remove the circulating current flowing in the upper or lower valve even under the unbalance voltage condition. The last term may indicate the compensator 24 that can suppress variations of the circulating current suppression inductor and resistor on the upper or lower valve.

In Equations (21) and (22), the proportional controller 21, the first resonant-type current controller 22, and the second resonant-type current controller 23 can be expressed as Equations (23) to (25), respectively.

$$P(err_{pnj2}) = (K_p)err_{pnj2} \quad (23)$$

$$R_1(err_{pnj2}) = \left(\frac{K_{i1}s}{s^2 + (\omega_0)^2}\right)err_{pnj2} \quad (24)$$

$$R_2(err_{pnj2}) = \left(\frac{K_{i2}s}{s^2 + (2\omega_0)^2}\right)err_{pnj2} \quad (25)$$

In Equations (23) to (25), pnj2 may represent either upper valve or lower valve.

Equations (21) and (22) can be expressed as Equations (26) and (27) when controllers are designed into a simplified form.

$$u^*_{pj2} = \left(\frac{V_{dc2}}{2} - E_{sj}\right) - \\ \{P(err_{pj2}) + R_1(err_{pj2}) + R_2(err_{pj2})\} - \{\rho_{pj2}\,\text{sgn}(err_{pj2})\} \quad (26)$$

$$u^*_{nj2} = \left(\frac{V_{dc2}}{2} + E_{sj}\right) - \\ \{P(err_{nj2}) + R_1(err_{nj2}) + R_2(err_{nj2})\} - \{\rho_{nj2}\,\text{sgn}(err_{nj2})\} \quad (27)$$

Here, the sgn function denotes a sign function operating with:

$$\text{sgn}(\text{err}_{pj2})=1(\text{err}_{pj2}>0)$$

$$\text{sgn}(\text{err}_{pj2})=0(\text{err}_{pj2}\leq 0)$$

$$\text{sgn}(\text{err}_{nj2})=1(\text{err}_{nj2}>0)$$

$$\text{sgn}(\text{err}_{nj2})=0(\text{err}_{nj2}\leq 0)$$

and $\rho_{pj2}$ and $\rho_{nj2}$ denote proportional gains.

The above equation *can be* further simplified *into* Equations (28) and (29).

$$u_{pj2}^* = \left(\frac{V_{dc2}}{2} - E_{sj}\right) - \{P(err_{pj2}) + R_1(err_{pj2}) + R_2(err_{pj2})\} \quad (28)$$

$$u_{nj2}^* = \left(\frac{V_{dc2}}{2} + E_{sj}\right) - \{P(err_{nj2}) + R_1(err_{nj2}) + R_2(err_{nj2})\} \quad (29)$$

Hereinafter, a method of determining the reference value ($i^*_{pj2}$) of the upper valve current and the reference value ($i^*_{nj2}$) of the lower valve current will be described as follows.

A half current of the phase current and the circulating current ($i_{diffj}$) may mixedly flow in the valve like Equations (30) and (31).

$$i_{pj2} = \frac{i_{sj}}{2} + (i_{diffj}) \quad (30)$$

$$i_{nj2} = -\frac{i_{sj}}{2} + (i_{diffj}) \quad (31)$$

Since the circulating current can be divided into a DC component and an AC component ($i_{dczj}$), Equations (30) and (31) can be expressed as Equations (32) and (33) below.

$$i_{pj2} = \frac{i_{sj}}{2} + \left(\frac{i_{dc2}}{3} + i_{dczj}\right) \quad (32)$$

$$i_{nj2} = -\frac{i_{sj}}{2} + \left(\frac{i_{dc2}}{3} + i_{dczj}\right) \quad (33)$$

In Equations (32) and (33), since the DC component of the circulating current is a component that is involved in energy transmission, the DC component may not be removed. Accordingly, only the AC component of the circulating current may be removed.

Thus, the reference value of the valve current can be expressed as Equation (34) using the phase current reference value and the DC link voltage other than the AC component of the circulating current having harmonic characteristics.

$$i_{pj2}^* = \frac{i_{dc2}^*}{3} + \frac{i_{sj}^*}{2} \quad (34)$$

$$i_{nj2}^* = \frac{i_{dc2}^*}{3} - \frac{i_{sj}^*}{2}$$

$(j = a, b, c)$

Here, the phase current reference value may be determined by Equations (35) to (40).

$$i_{sq}^{p^*} = PI(V_{dc2}^* - V_{dc2})i_{sq}^{p^*} = PI(P_s^* - P_s) \quad (35)$$

$$i_{sd}^{p^*} = PI(Q_s^* - Q_s) \quad (36)$$

$$i_{sq}^{n^*} = -\frac{E_{sd}^n}{E_{sq}^p}i_{sd}^p - \frac{E_{sq}^n}{E_{sq}^p}i_{sq}^p \quad (37)$$

$$i_{sd}^{n^*} = \frac{E_{sq}^n}{E_{sq}^p}i_{sd}^p - \frac{E_{sd}^n}{E_{sq}^p}i_{sq}^p \quad (38)$$

$$i_{s\alpha\beta}^* = i_{sdq}^{p^*}e^{j\omega t} + i_{sdq}^{n^*}e^{-j\omega t} \quad (39)$$

$$\begin{bmatrix} i_{sa}^* \\ i_{sb}^* \\ i_{sc}^* \end{bmatrix} = \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} i_{s\alpha}^* \\ i_{s\beta}^* \end{bmatrix} \quad (40)$$

That is, regarding the reference value with respect to the phase current, a current reference value may be determined in a d-q frame, and then is transformed into a stationary reference frame to determine a 3-phase current reference value.

A DC current reference value flowing in the DC system may be determined by the energy conservation law that energy (active power) of the AC system and energy (active power) of the DC system are conserved, which can be expressed as Equation (41).

$$i_{dc2}^* = \frac{3}{2}\left(\frac{E_{sq}^p}{V_{dc2}}\right)i_{sq}^{p^*} \quad (41)$$

So far, a method of substituting the parameter variation term ($l_{pj2}, l_{nj2}$) with the sgn( ) function include in Equations (15) and (16) and then designing the control law has been described. From now on, a method of designing the compensator by applying the backstepping control method with respect to the parameter variation term ($l_{pj2}, l_{nj2}$) will be proposed, and then a method of designing the control law using an estimated value ($\hat{l}_{pj2}, \hat{l}_{nj2}$) of the parameter variation term will be proposed.

The Lyapunov function that is modified from Equation (13) so as to include an error of the estimated value of the parameter variation term can be expressed as Equation (42).

$$V_1 = \frac{1}{2}err_{pj2}^2 + \frac{1}{2}err_{nj2}^2 + \frac{1}{2m_1}(\hat{l}_{pj2} - l_{pj2})^2 + \frac{1}{2m_2}(\hat{l}_{nj2} - l_{nj2})^2 \quad (42)$$

If Equation (42) is differentiated and then substituted with Equations (11) and (12), Equation (43) in which the estimated value of the parameter variation term is added can be obtained.

$$\dot{V}_1 = err_{pj2}\left\{\dot{i}^* - \left(-\frac{R_s}{L_s}i_{pj2} + \frac{1}{L_s}\left(\frac{V_{dc2}}{2} - u_{pj2}\right) - \frac{1}{L_s}E_{sj} + l_{pj2}\right)\right\} + \quad (43)$$

$$err_{nj2}\left\{\dot{i}_{nj2}^* - \left(-\frac{R_s}{L_s}i_{nj2} + \frac{1}{L_s}\left(\frac{V_{dc2}}{L_s} - u_{nj2}\right) + \frac{1}{L_s}E_{sj} + l_{nj2}\right)\right\} +$$

-continued $$(\hat{l}_{pj2} - l_{pj2})\frac{\hat{i}'_{pj2}}{m_1} + (\hat{l}_{nj2} - l_{nj2})\frac{\hat{i}'_{pj2}}{m_2}$$

From the first term and the second term of Equation (43), the upper valve voltage ($u_{pj2}$) and the lower valve voltage ($u_{nj2}$) may be expressed as Equations (44) and (45), and may be selected in a form including the estimated value ($\hat{l}_{pj2}, \hat{l}_{nj2}$) of the parameter variation term.

$$u_{pj2} = \left(\frac{V_{dc2}}{2} - E_{sj}\right) - \left\{(L_s K_{pj2} err_{pj2} + R_s i_{pj2}) + L_s \hat{i}'^*_{pj2} - L_s \hat{l}_{pj2}\right\} \quad (44)$$

$$u_{nj2} = \left(\frac{V_{dc2}}{2} + E_{sj}\right) - \left\{(L_s K_{nj2} err_{nj2} + R_s i_{nj2}) + L_s \hat{i}'^*_{nj2} - L_s \hat{l}_{nj2}\right\} \quad (45)$$

In order to allow Equation 43 to always have a negative value, if Equation (43) is substituted with Equations (44) and (45), Equation (43) can be simplified into Equation (46).

$$V_1' = -K_{pj2} err^2_{pj2} - K_{nj2} err^2_{nj2} + \qquad (46)$$

$$(\hat{l}_{pj2} - l_{pj2})\left(err_{pj2} + \frac{\hat{i}'_{pj2}}{m_1}\right) + (\hat{l}_{nj2} - l_{nj2})\left(err_{nj2} + \frac{\hat{i}'_{nj2}}{m_2}\right).$$

In order to allow Equation (46) to always have a negative value, the third term and the fourth term of Equation (46) may be designed to be "0". A relationship between Equation (47) and Equation (48) may be obtained from the above-mentioned controller design method.

Accordingly, if Equations (47) and (48) are integrated, the estimated values $\hat{l}_{pj2}, \hat{l}_{nj2}$) of the parameter variation term can be obtained.

$$[/\$]\$'\$\$[/\$]\$' A\ddot{X}\hat{l}_{pj2}=-m_1 err_{pj2} \qquad (47)$$

$$[/\$]\$'\$\$[/\$]\$' A\ddot{X}\hat{l}_{nj2}=-m_2 err_{nj2} \qquad (48)$$

Since the estimated values ($\hat{l}_{pj2}, \hat{l}_{nj2}$) of the parameter variation term can be seen, the control law that determines the upper valve voltage reference value ($u^*_{pj2}$) and the lower valve voltage reference value ($u^*_{nj2}$) can be obtained.

Similarly to the control law expressed as Equations (21) and (22), the current controller related to control of active power and reactive power (or DC link voltage control and reactive power) having a basic frequency (AC-grid frequency) may be designed with the proportional controller 21 and the first resonant-type current controller 22. Also, since all signals corresponding to two times of the basic frequency (AC-grid frequency) are harmonic components, the current controller that can remove the harmonic components may be designed with the proportional controller 21 and the second resonant-type current controller 23. Thus, the upper valve voltage reference value ($u^*_{pj2}$) and the lower valve voltage reference value ($u^*_{nj2}$) can be expressed as Equations (49) and (50), respectively.

$$u^*_{pj2} = \left(\frac{V_{dc2}}{2} - E_{sj}\right) - \qquad (49)$$

$$\{P(err_{pj2}) + R_1(err_{pj2}) + R_2(err_{pj2})\} - \left\{L_s \hat{i}'^*_{pj2} - L_s \hat{l}_{pj2}\right\}$$

$$u^*_{nj2} = \qquad (50)$$

$$\left(\frac{V_{dc2}}{2} - E_{sj}\right) - \{P(err_{nj2}) + R_1(err_{nj2}) + R_2(err_{nj2})\} - \left\{L_s \hat{i}'^*_{nj2} - L_s \hat{l}_{nj2}\right\}$$

If Equations (49) and (50) are simplified to design a controller, Equations (51) and (52) can be obtained.

$$u^*_{pj2} = \left(\frac{V_{dc2}}{2} - E_{sj}\right) - \{P(err_{pj2}) + R_1(err_{pj2}) + R_2(err_{pj2})\} + \{L_s \hat{l}_{pj2}\} \qquad (51)$$

$$u^*_{nj2} = \left(\frac{V_{dc2}}{2} + E_{sj}\right) - \{P(err_{nj2}) + R_1(err_{nj2}) + R_2(err_{nj2})\} + \{L_s \hat{l}_{nj2}\}. \qquad (52)$$

Figure 5:
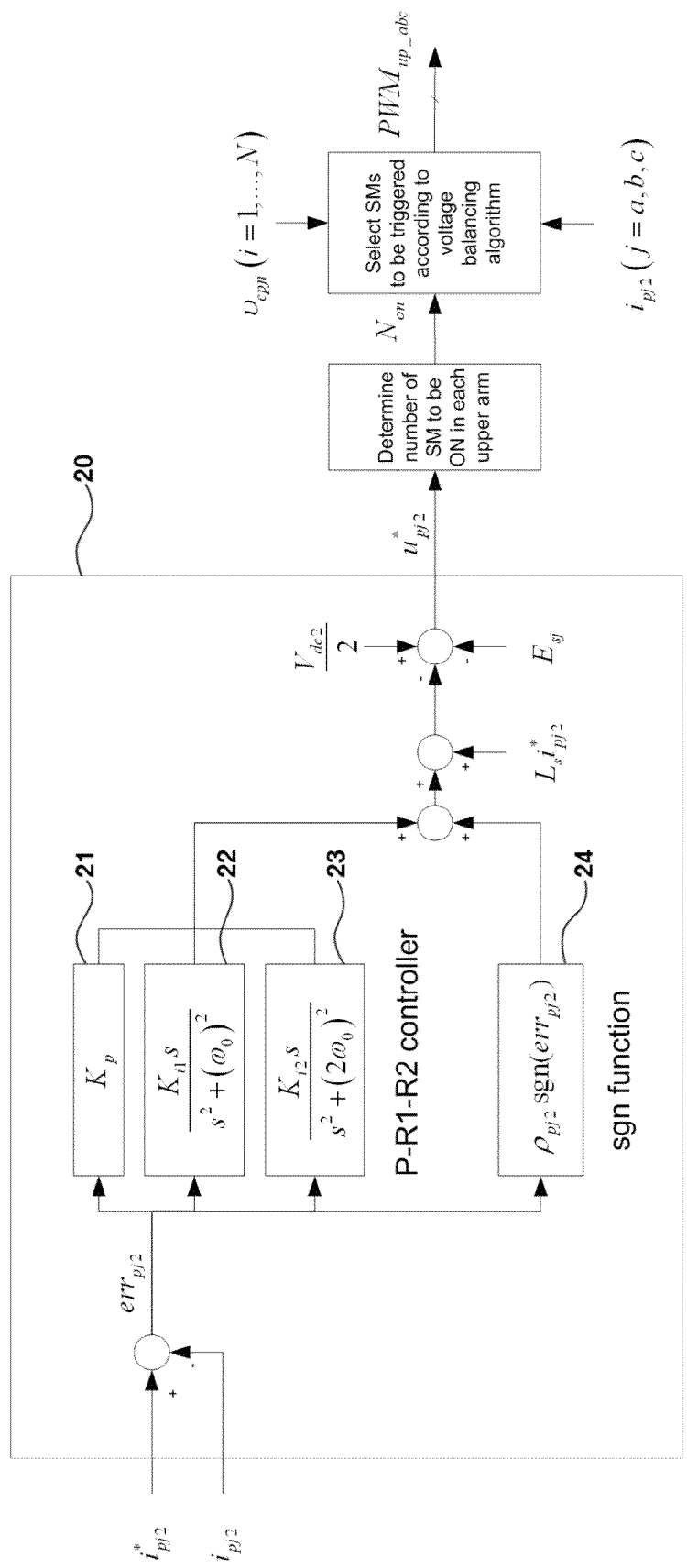
FIG. 5 is a view illustrating an internal configuration of a driving apparatus and method for a modular multi-level converter according to an exemplary embodiment of the present invention, where three upper valves are controlled.

FIG. 5 is a view illustrating an internal configuration of a driving apparatus and method for a modular multi-level converter according to an exemplary embodiment of the present invention, where three upper valves are controlled.

As shown in FIG. 5, a driving apparatus 20 for a modular multi-level converter that controls an upper valve may include a proportional controller 21, a first resonant-type current controller 22, a second resonant-type current controller 23, and a compensator 24.

The driving apparatus 20 for the modular multi-level converter may receive a current reference value and a value of a current flowing in the upper valve, and may obtain a difference therebetween to apply the difference to the proportional controller 21, the first resonant-type current controller 22, the second resonant-type current controller 23, and the compensator 24.

The outputted calculation values may be added up, and a voltage reference value may be generated by subtracting the sum from a voltage difference value between a DC link voltage value and a system voltage value.

Based on this voltage reference value, the number of submodules to be turned on and submodules may be selected from the upper valve, and a pulse width modulation signal may be applied to the submodules to drive the submodules.

Thus, the driving apparatus for the modular multi-level converter may directly measure the current value from the upper valve of the valve branch of a multi-level converter taking charge of one phase and may receive the current reference value to generate the voltage reference value. Accordingly, submodules to be driven may be selected and driven from the corresponding upper valve without a help of an upper controller.

Figure 6:
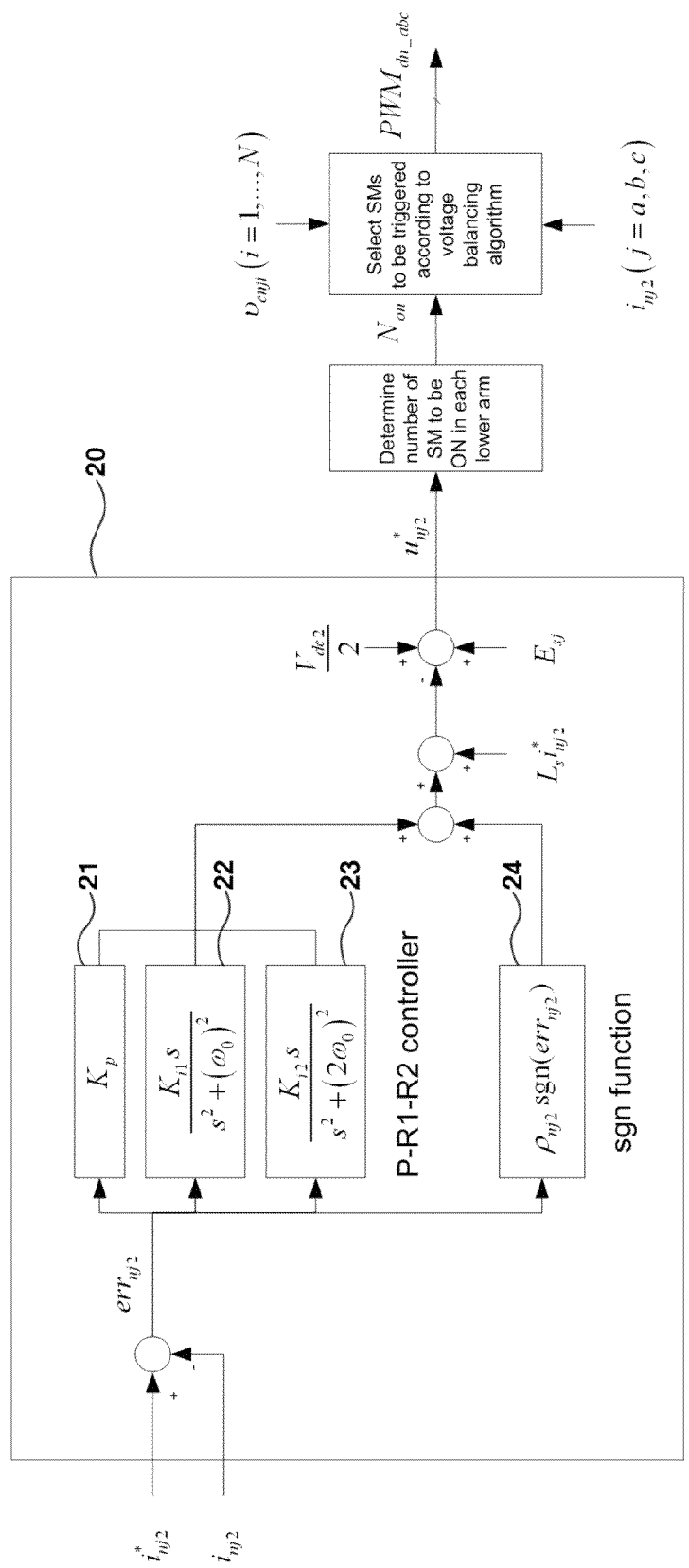
FIG. 6 is a view illustrating an internal configuration of a driving apparatus and method for a modular multi-level converter according to an exemplary embodiment of the present invention, where three lower valves are controlled.

FIG. 6 is a view illustrating an internal configuration of a driving apparatus and method for a modular multi-level converter according to an exemplary embodiment of the present invention, where three lower valves are controlled.

Similarly to the driving apparatus for the modular multi-level converter controlling the upper valve, a driving apparatus 20 for a modular multi-level converter controlling the lower valve may also include a proportional controller 21, a first resonant-type current controller 22, a second resonant-type current controller 23, and a compensator 24.

The driving apparatus 20 for the modular multi-level converter taking charge of the lower valve may receive a current reference value and a value of a current flowing in the upper valve, and may obtain a difference therebetween to apply the difference to the proportional controller 21, the first resonant-type current controller 22, the second resonant-type current controller 23, and the compensator 24.

The outputted calculation values may be added up, and a voltage reference value may be generated by subtracting the sum from a sum of a DC link voltage value and a system voltage value.

Based on this voltage reference value, the number of submodules to be turned on and submodules may be selected from the upper valve, and a pulse width modulation signal may be applied to the submodules to drive the submodules.

Figure 7:
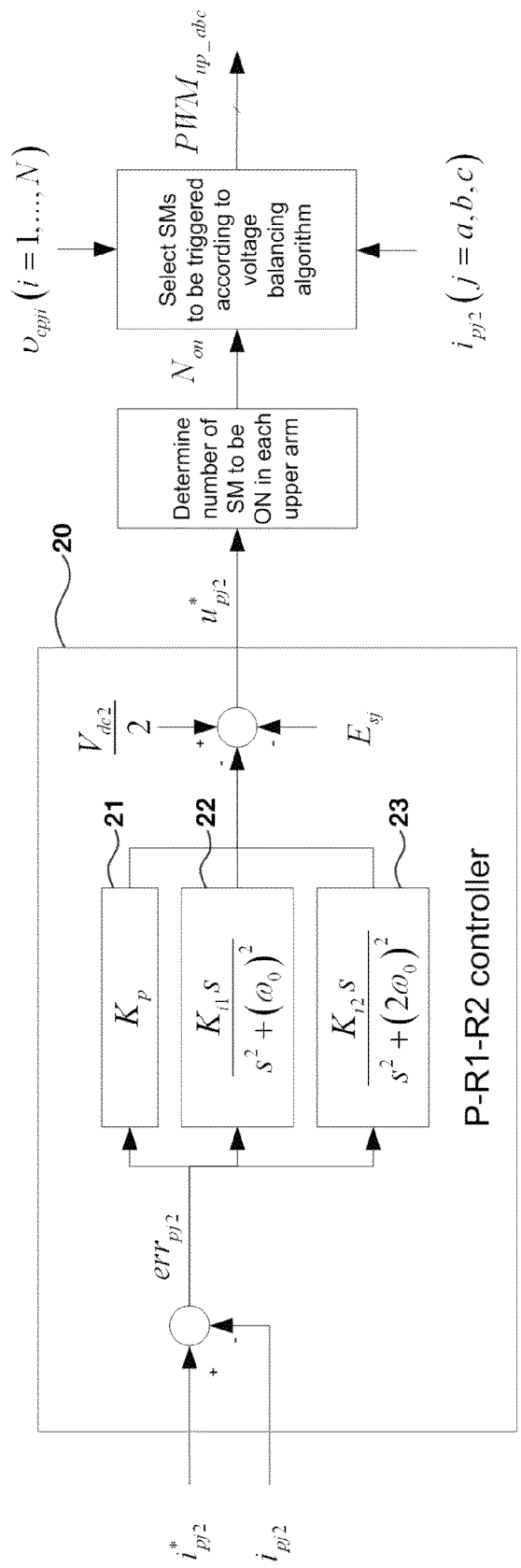
FIG. 7 is a view illustrating a simplified example of the driving apparatus for the modular multi-level converter of FIG. 5.

FIG. 7 is a view illustrating a simplified example of the driving apparatus for the modular multi-level converter of FIG. 5.

The driving apparatus for the modular multi-level converter shown in FIG. 7 may be configured to exclude the compensator 24 from the components of the driving apparatus for the modular multi-level converter shown in FIG. 5.

The modular multi-level converter of FIG. 7 can reduce the amount of operation by omitting the compensator 24.

Accordingly, a user who uses the driving apparatus and method for the modular multi-level converter may also design so as to additionally include the compensator 24 to generate a more accurate valve voltage reference value. On the other hand, a user who prefers speed to accuracy may select the simplified driving apparatus for the modular multi-level converter that omits the compensator 24.

Figure 8:
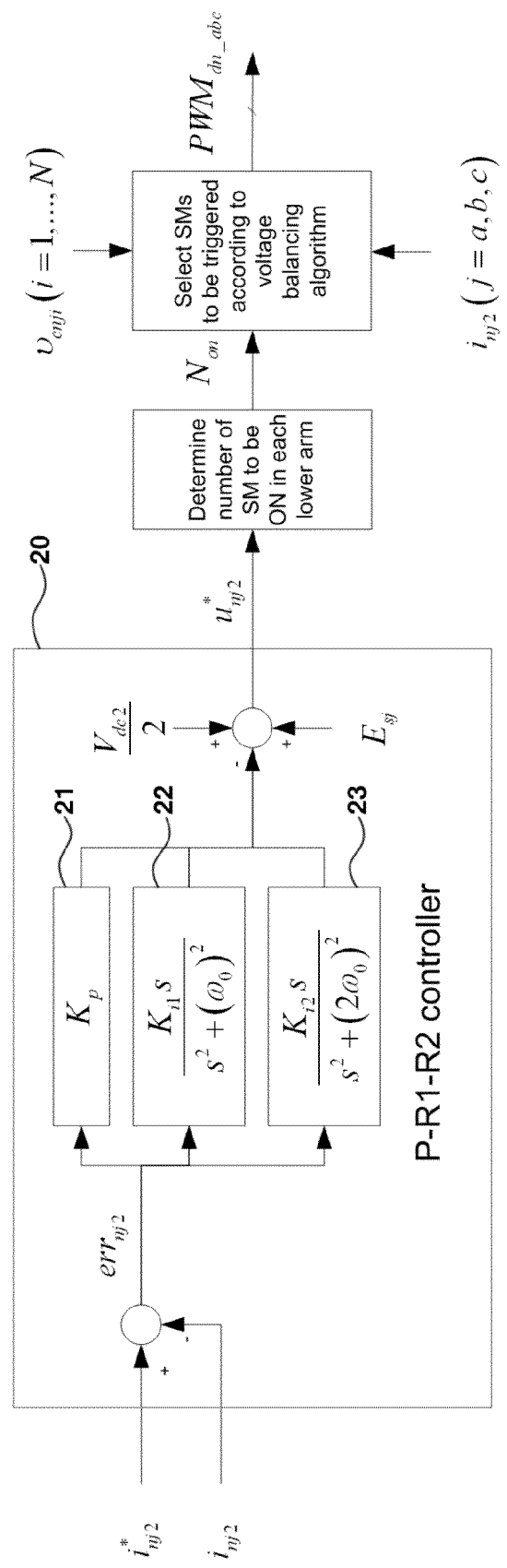
FIG. 8 is a view illustrating a simplified example of the driving apparatus for the modular multi-level converter of FIG. 6.

FIG. 8 is a view illustrating a simplified example of the driving apparatus for the modular multi-level converter of FIG. 6.

The driving apparatus for the modular multi-level converter shown in FIG. 8 may also be configured to exclude the compensator 24 from the components of the driving apparatus for the modular multi-level converter shown in FIG. 6.

The driving apparatus 20 for the modular multi-level converter 20 may obtain a difference between a current reference value of the lower valve and a measured value of a current flowing in the lower valve and may obtain an sum of values calculated by passing the error value through the proportional controller 21, the first resonant-type current controller 22, and the second resonant-type current controller 23.

Thereafter, the driving apparatus 20 for the modular multi-level converter 20 may generated a voltage reference value applied to the lower valve, by subtracting the sum of values calculated by passing through the proportion controller 21, the first resonant-type current controller 22, and the second resonant-type current controller 23 from a sum of a half of the DC link voltage and the system voltage.

Figure 9:
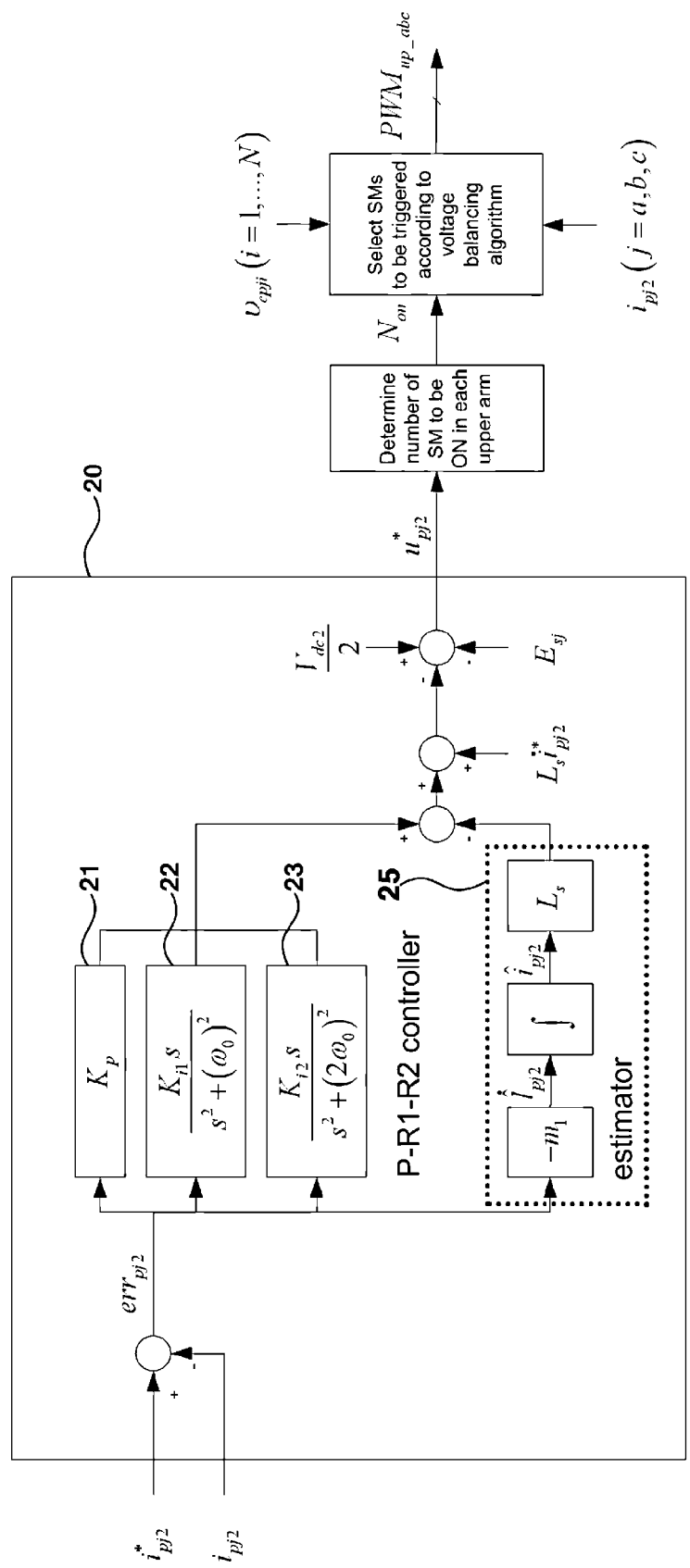
FIG. 9 is a view illustrating an estimator added to the driving apparatus for the modular multi-level converter of FIG. 7.

FIG. 9 is a view illustrating an estimator added to the driving apparatus for the modular multi-level converter of FIG. 7.

A driving apparatus 20 for a modular multi-level converter may further include an estimator 25. The estimator 25 may calculate a parameter variation value due to a magnitude variation of circulating current suppression inductor and resistor components of the driving apparatus 20 for the modular multi-level converter.

Figure 10:
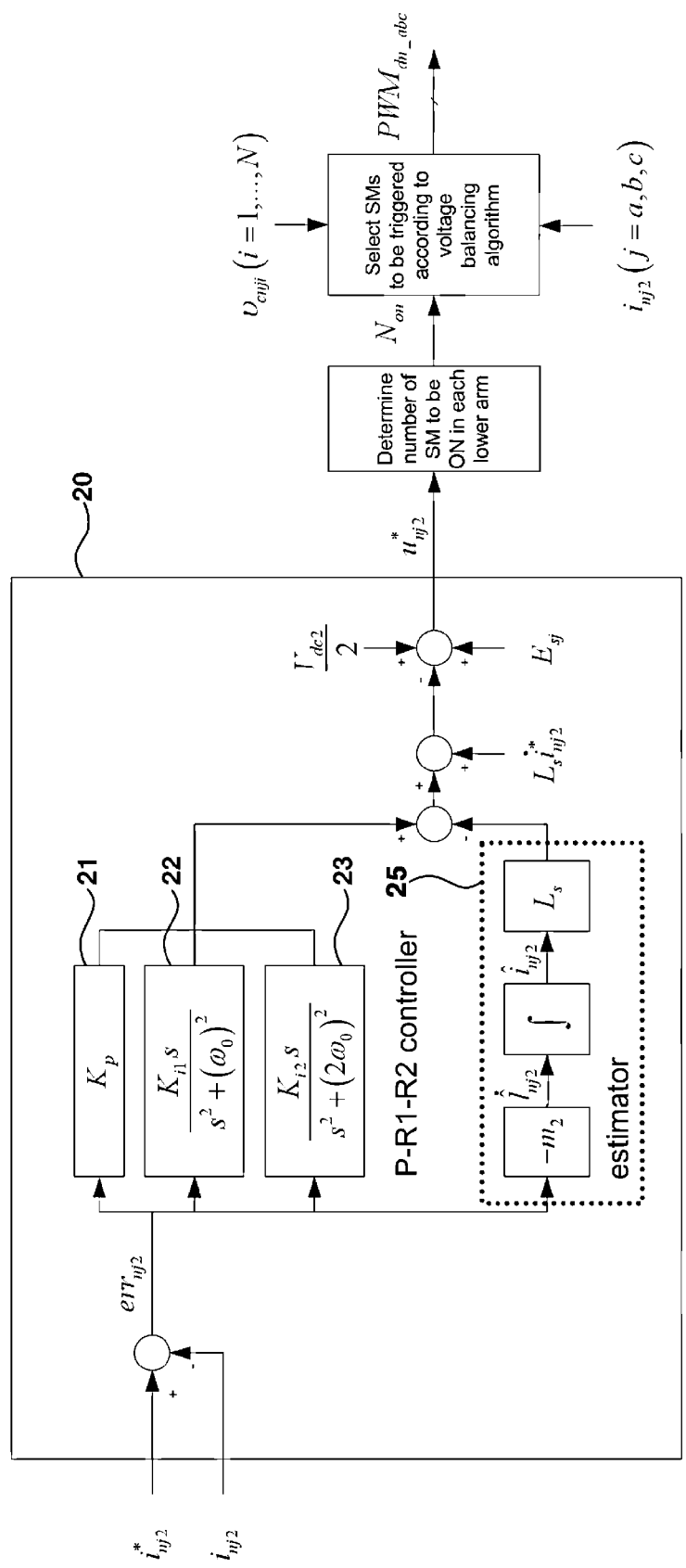
FIG. 10 is a view illustrating an estimator added to the driving apparatus for the modular multi-level converter of FIG. 8.

The estimator 25 may amplify an error value between the current reference value and the measured current value using a predetermined tuning parameter FIG. 10 is a view illustrating an estimator added to the driving apparatus for the modular multi-level converter of FIG. 8.

Similarly to FIG. 9, a driving apparatus 20 for a modular multi-level converter may further include an estimator 25. The estimator 25 may calculate a parameter variation value due to a magnitude variation of circulating current suppression inductor and resistor components of the driving apparatus 20 for the modular multi-level converter.

Also, the driving apparatus 20 for the modular multi-level converter may subtract a calculated value of the estimator 25 from a sum of values outputted from the proportional controller 21, the first resonant-type current controller 22, and the second resonant-type current controller 23.

A voltage reference value of the lower valve of the driving apparatus 20 for the modular multi-level converter may be generated by subtracting the foregoing calculated value from a sum of a half of the DC link voltage value and the system voltage value.

Figure 11:
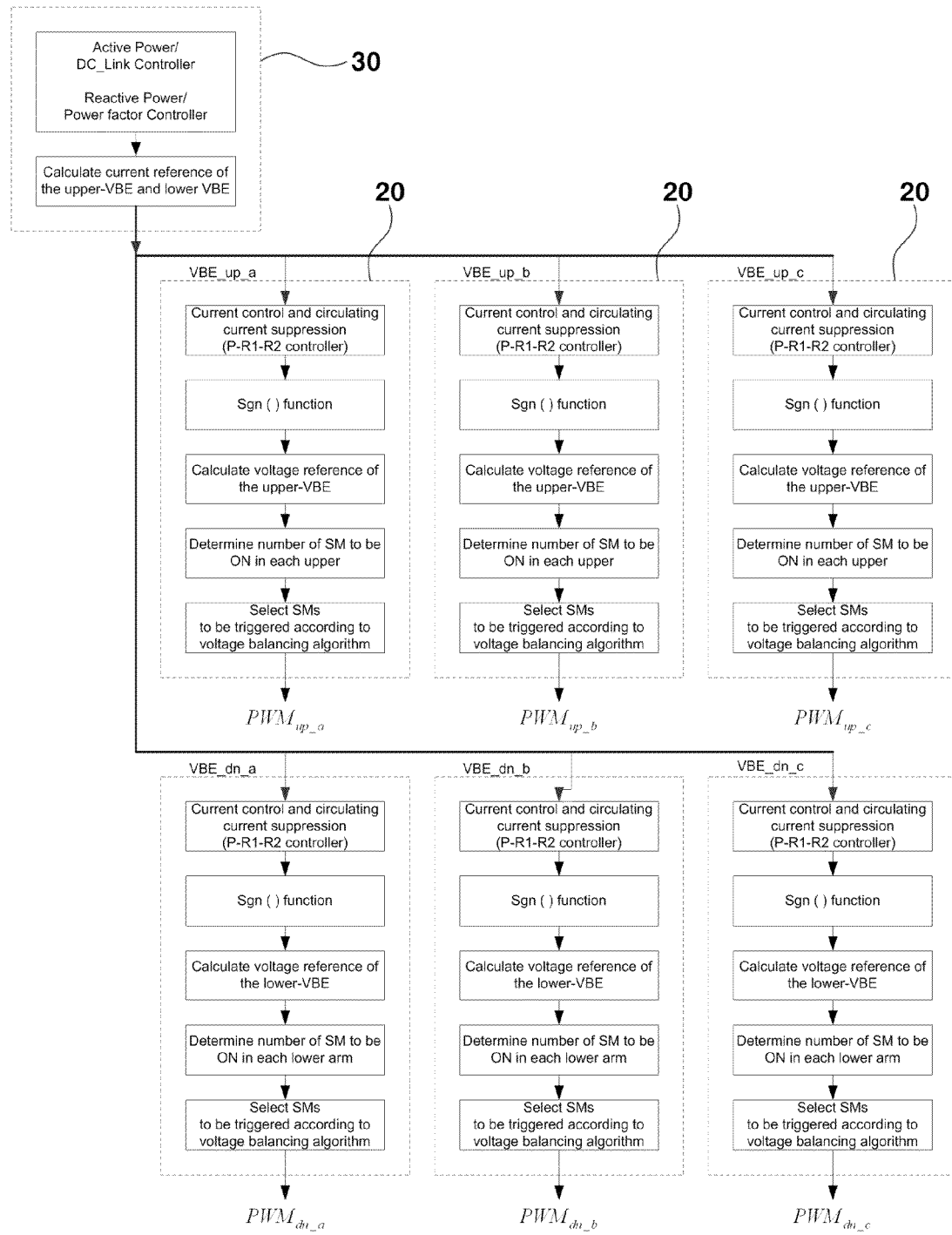
FIG. 11 is a view illustrating a relationship between a driving apparatus for a modular multi-level converter and an upper controller thereover according to an exemplary embodiment of the present invention.

FIG. 11 is a view illustrating a relationship between a driving apparatus for a modular multi-level converter and an upper controller thereover according to an exemplary embodiment of the present invention.

Unlike a typical controller, an upper controller 30 of the driving apparatus for the modular multi-level converter may serve to calculate only a reference current value to be applied to the upper valve and a reference current value to be applied to the lower valve. Detail calculation may be performed by the driving apparatus 20 for the modular multi-level converter.

Specifically, a value to suppress the circulating current may be obtained using the proportional controller 21, the first resonant-type current controller 22 and the second resonant-type current controller 23, and an error due to a parameter variation may be obtained using the sgn function. Thus, a voltage reference value to be used in the driving apparatus and method for the modular multi-level converter may be generated using the forgoing obtained values. Also, the number of submodules may be determined, and a pulse width modulation signal may be applied to each submodule that is selected. That is, since most calculation is performed by unit of valve, frequent data exchange between the controller 30 and the valve controller can be omitted. Accordingly, distributed control can be achieved.

Figure 12:
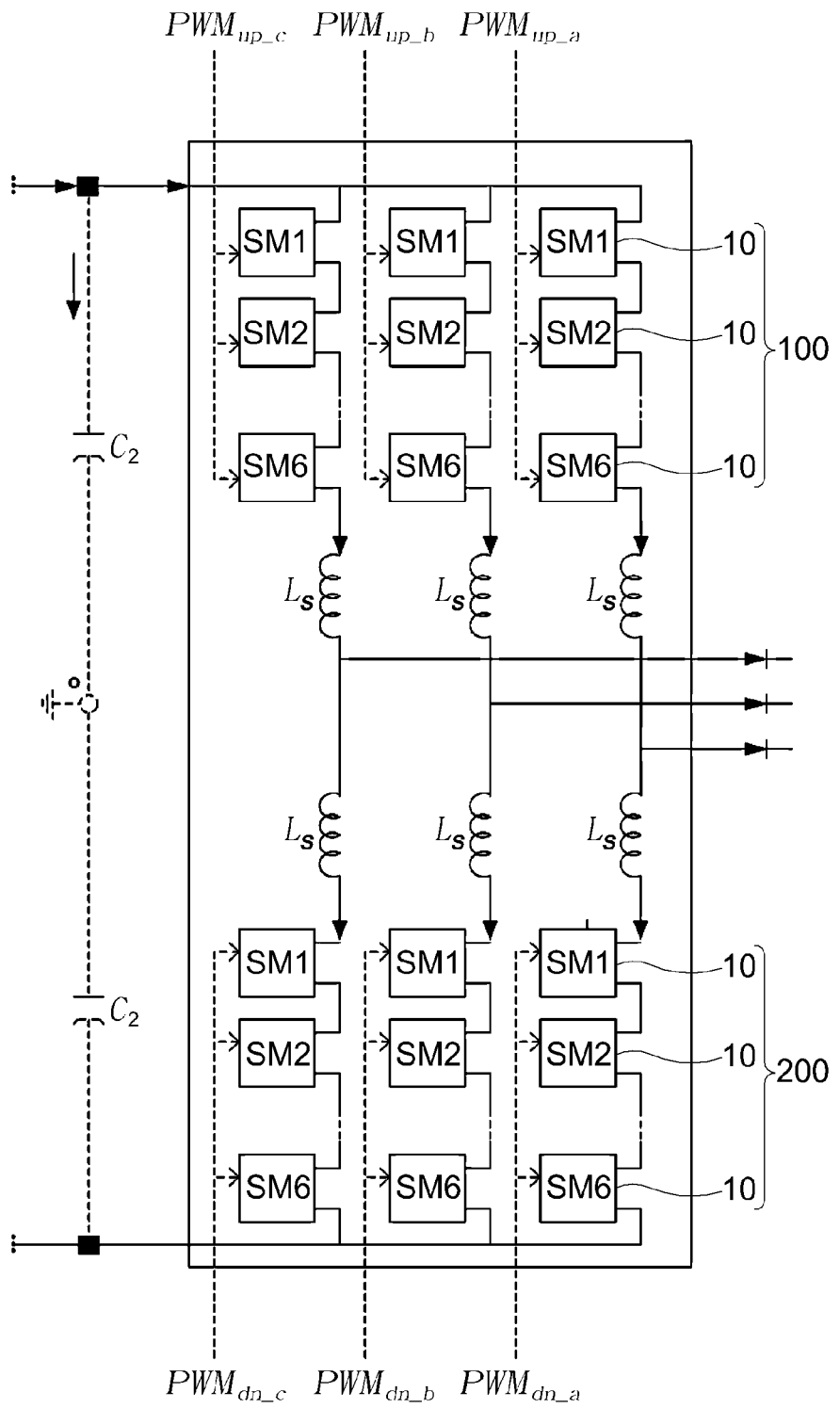
FIG. 12 is a view illustrating a pulse width modulation signal applied to a driving apparatus for a modular multi-level converter according to an exemplary embodiment of the present invention.
Figure 13A:
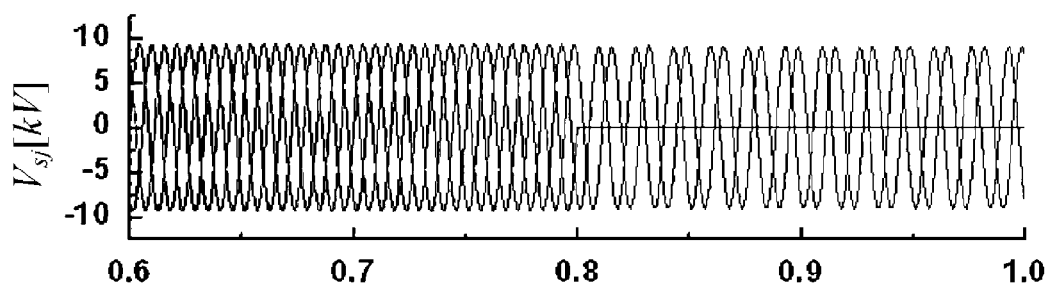
FIG. 13 is a graph illustrating values measured in each system and DC link when a circulating current is not suppressed in a typical multi-level converter.
Figure 13B:
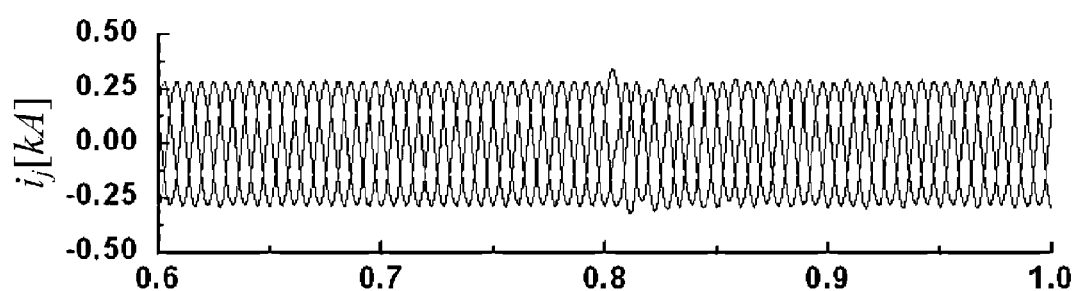
Figure 13C:
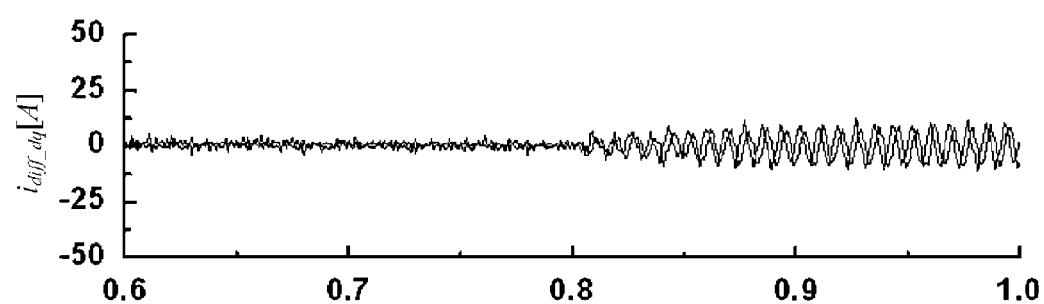
Figure 13D:
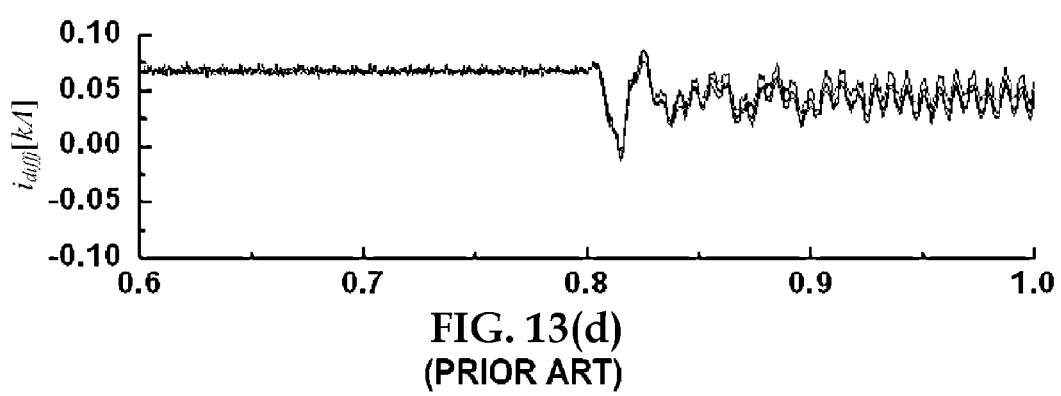
Figure 13E:
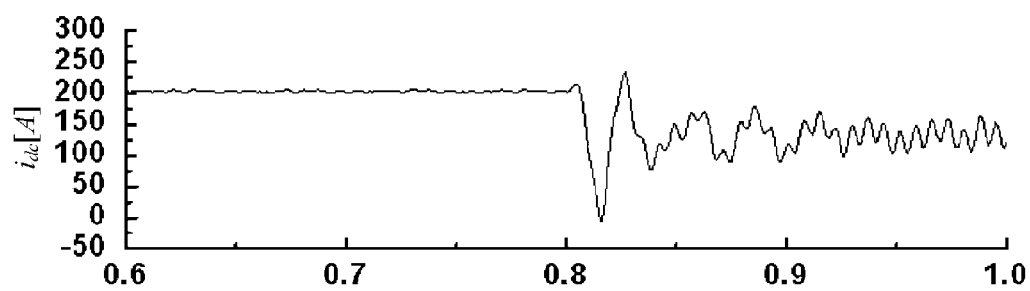
Figure 13F:
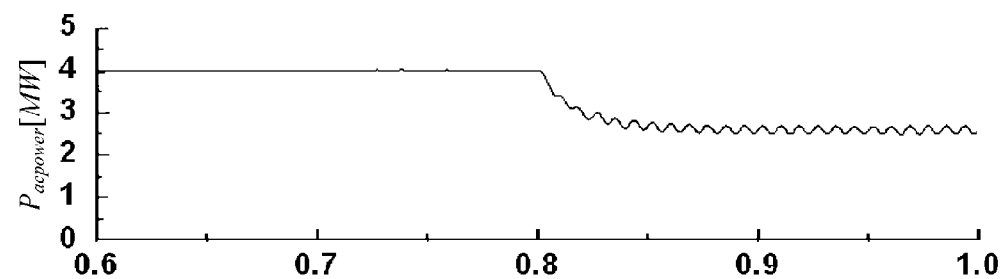

FIG. 12 is a view illustrating a pulse width modulation signal applied to a driving apparatus for a modular multi-level converter according to an exemplary embodiment of the present invention.

In FIG. 12, it can be confirmed that a pulse width modulation signal corresponding to the voltage reference value calculated through the foregoing processes is applied to each submodule of a corresponding valve unit.

The term "valve unit" refers to an upper valve or a lower valve of the valve branch taking charge of one phase of the AC system.

Accordingly, the pulse width modulation signals applied to each valve unit may differ from each other in pulse width. Also, a pulse width signal generated by the valve controller according to the voltage reference value may be applied according to the situation of each valve unit Hereinafter, effects of the driving apparatus and method for the modular multi-level converter according to the exemplary embodiment of the present invention will be described with reference to graphs below.

FIG. 13 is a graph illustrating values measured in each system and DC link when a circulating current is not suppressed in a typical multi-level converter.

FIG. 13 shows (a) a value of system voltage, (b) a value of an AC system current of the modular multi-level converter, and (c) a circulating current flowing through a valve in the d-q frame, and shows (d) a circulating current flowing through a valve in the stationary reference frame. Also, FIG. 13 shows (e) a value of a DC link current and (f) a value of active power.

As shown in FIG. 13, when the system has an unbalance voltage, a harmonic component may rapidly increase in the circulating current flowing inside the converter, making it difficult to ensure an operation within a stable current limit. Also, since a harmonic component severely occurs in a current of the DC system, the transmission quality may be deteriorated.

Also, it can be seen that the quality is deteriorated due to a rapid increase of the harmonic component in a value of active power of the AC system.

FIG. 14 is a graph illustrating results of control using the method of Qingrui Tu (2012) when an unbalance state occurs in a typical multi-level converter.

FIG. 14 shows (a) a value of system voltage, (b) a value of an AC system current of the modular multi-level converter, and (c) a circulating current flowing through a valve in the stationary reference frame, and shows (d) a circulating current flowing through a valve in the d-q frame. Also, FIG. 14 shows (e) a value of active power of the AC system, (f) a value of a current of the DC link, and (g) a value of a voltage applied to the submodule.

Figure 14A:
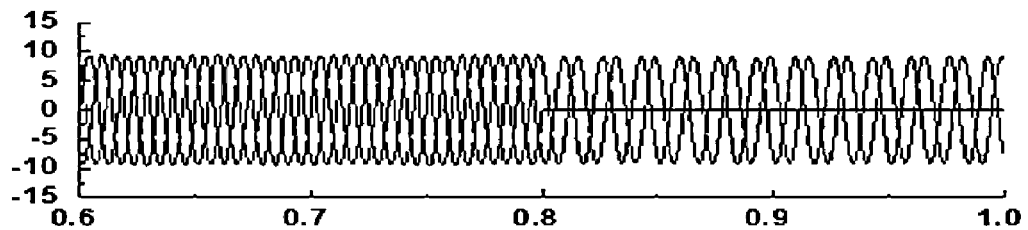
FIG. 14 is a graph illustrating results of control using the method of Qingrui Tu (2012) when an unbalance state occurs in a typical multi-level converter.
Figure 14B:
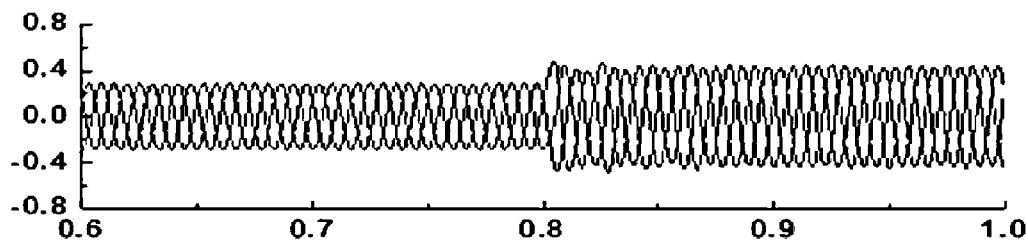
Figure 14C:
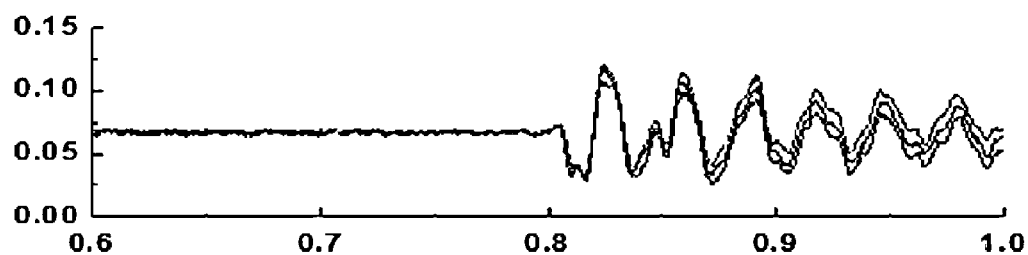
Figure 14D:
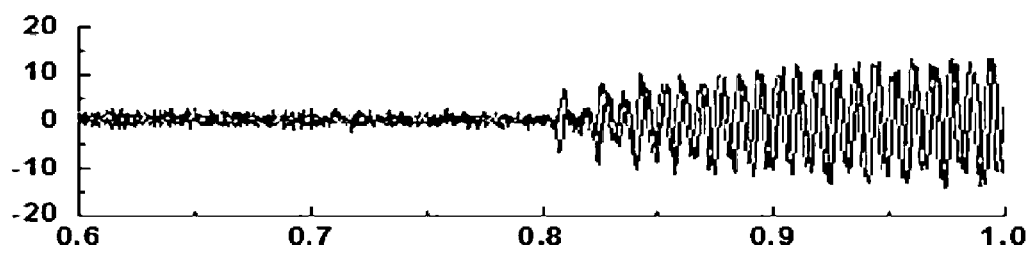
Figure 14E:
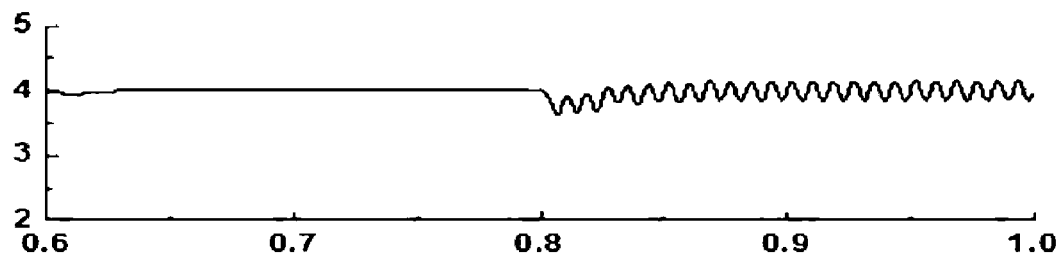
Figure 14F:
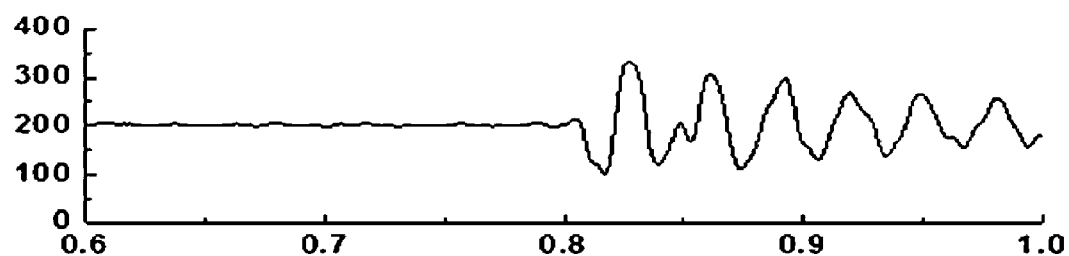
Figure 14G:
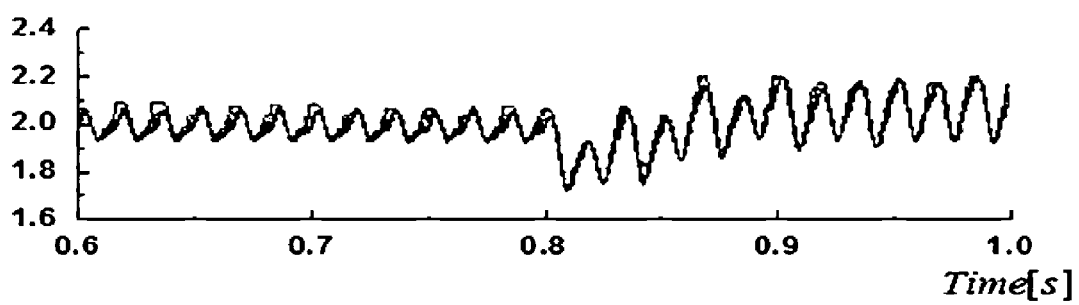

Compared to FIG. 13, when the method of FIG. 14 is used, it can be seen that the harmonic characteristics were slightly improved but the circulating current was not completely removed as shown in FIGS. 14C and 14D. Also, transient state characteristics may not be good, and the harmonics may be much included even at a stationary state. Since ripples are also severely formed in a current of the DC link, it can be seen that control is performed while much harmonic component is still included.

On the other hand, the driving apparatus and method for the modular multi-level converter according to the exemplary embodiment of the present invention can fully control the harmonic components included in the circulating current, the AC system or DC link regardless of the unbalance voltage condition.

Figure 15:
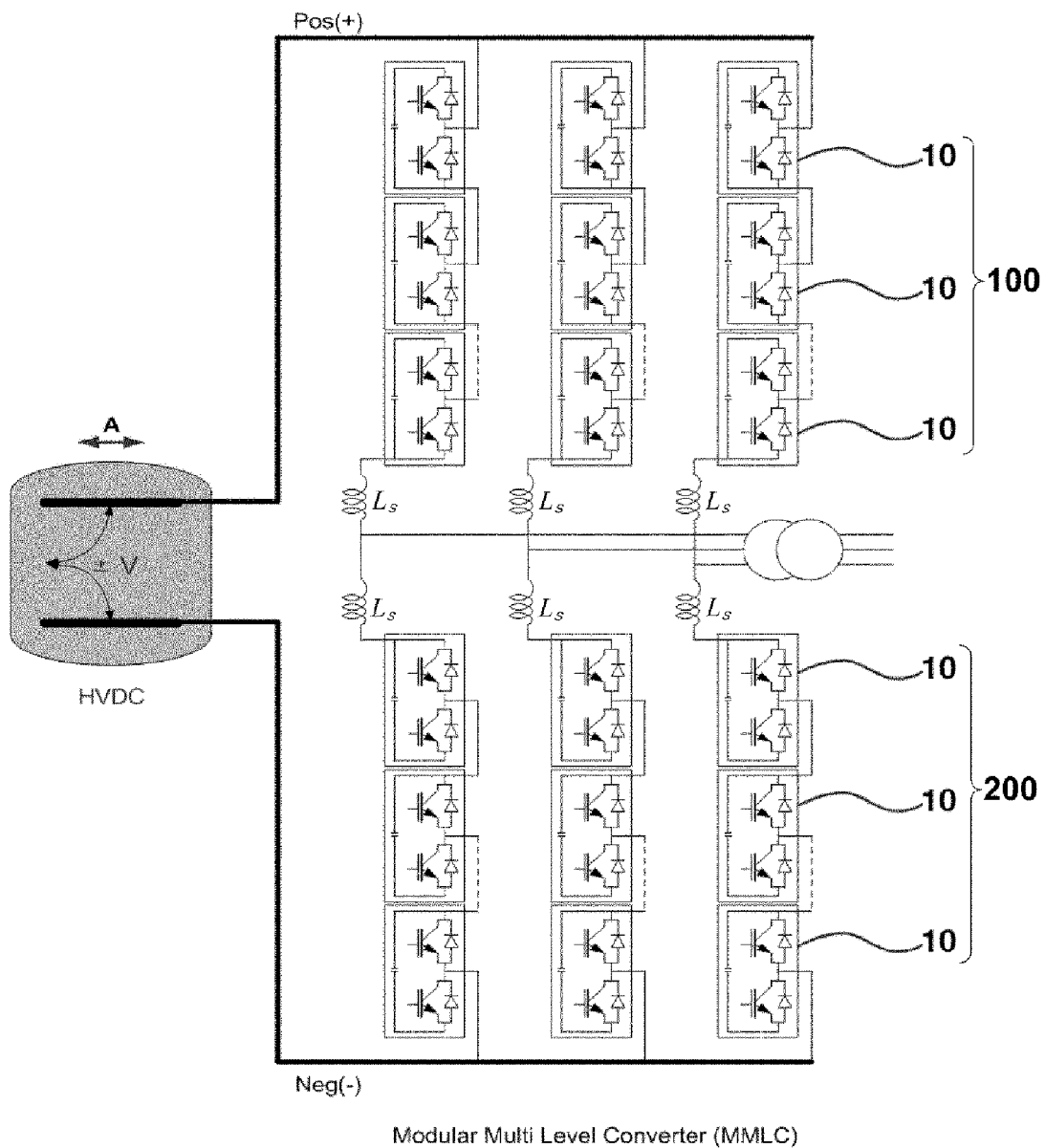
FIG. 15 is a view illustrating a configuration of a modular multi-level converter using a driving method of the modular multi-level converter according to an exemplary embodiment of the present invention.

FIG. 15 is a view illustrating a configuration of a modular multi-level converter using a driving method of the modular multi-level converter according to an exemplary embodiment of the present invention, and FIG. 16 is a view illustrating values of parameters to be used in a driving apparatus and method for a modular multi-level converter according to an exemplary embodiment of the present invention.

FIG. 17 is a graph illustrating results of control by a driving apparatus and method for a modular multi-level converter according to an exemplary embodiment of the present invention.

FIG. 17 shows (a) a system voltage, (b) an AC system current of the modular multi-level converter, and (c) a circulating current flowing in a valve branch in the stationary reference frame, and shows (d) a circulating current flowing in the valve branch in the d-q frame. Also, FIG. 17 shows (e) active power of the AC system, (f) a current of the DC link, and (g) a voltage applied to the submodule.

As shown in FIGS. 13 and 14, when one phase among 3-phase system voltage is grounded, a typical method shows oscillation characteristics up and down, and thus is not good in transient state characteristics and stationary state characteristics regarding control of the circulating current.

Figure 17A:
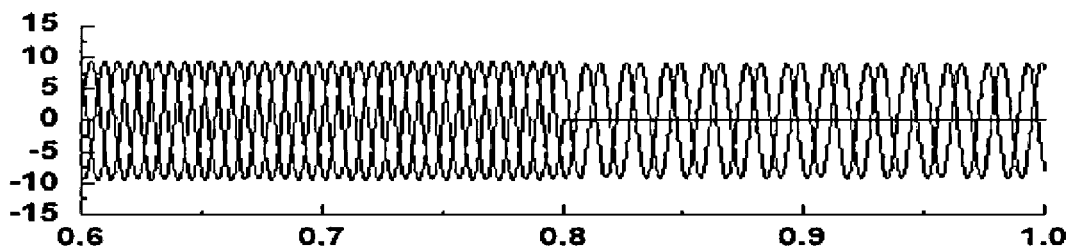
FIG. 17 is a graph illustrating results of control by a driving apparatus and method for a modular multi-level converter according to an exemplary embodiment of the present invention.
Figure 17B:
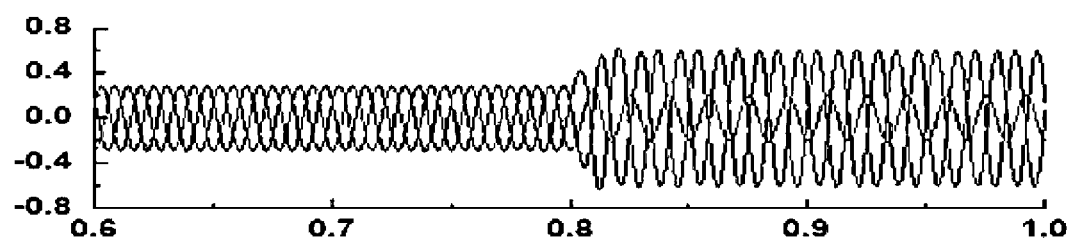
Figure 17C:
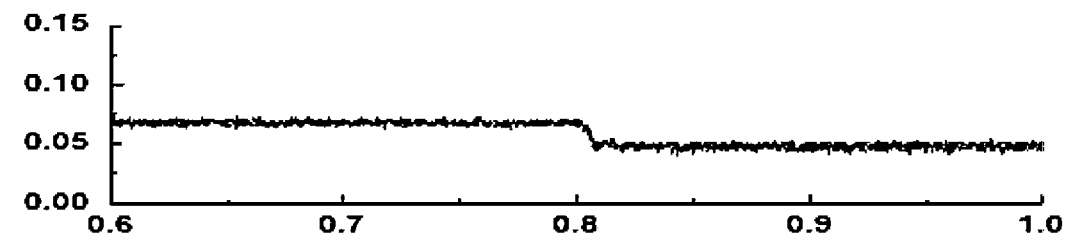
Figure 17D:
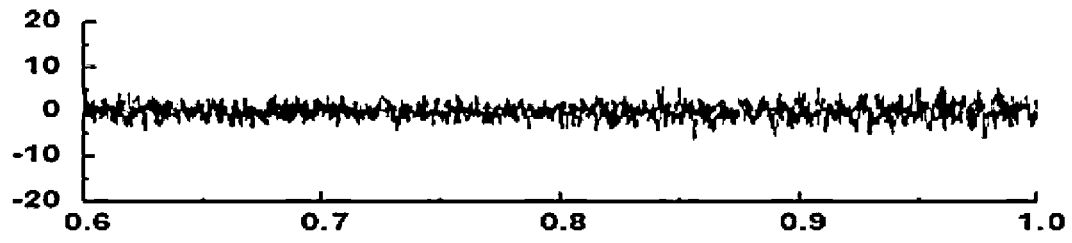

However, as shown in FIGS. 17C and 17D, it can be seen that the driving apparatus and method for the modular multi-level converter according to the exemplary embodiment of the present invention shows excellent response and convergence of the circulating current.

Figure 17E:
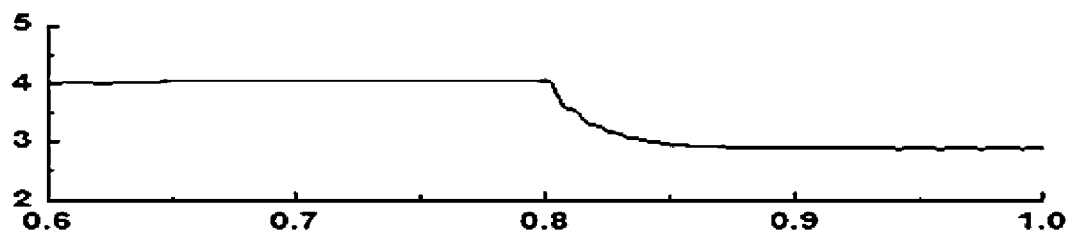
Figure 17F:
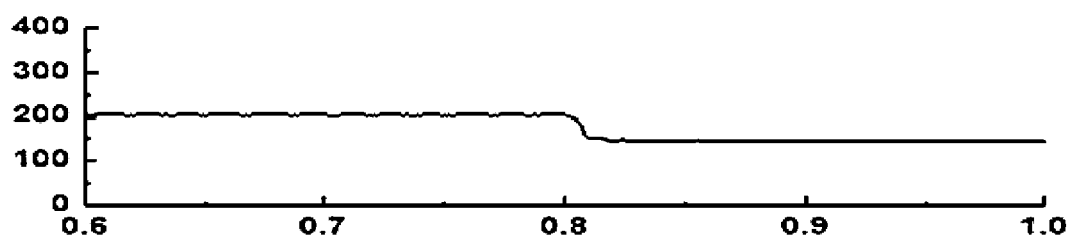
Figure 17G:
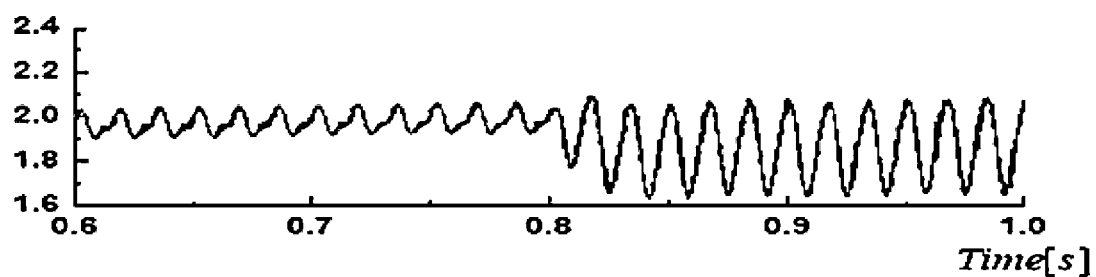

Also, while a typical method is not good in the transient state characteristics of the DC link current and includes a harmonic component even in the stationary state, it can be seen that the driving method for the modular multi-level converter according to the exemplary embodiment of the present invention shows significant improvement in both transient state characteristics and stationary state characteristics as shown in FIG. 17F.

In terms of active power control, while a typical method shows that the active power has a harmonic component, it can be seen that the driving apparatus and method for the modular multi-level converter according to the exemplary embodiment of the present invention shows that the harmonic component is completely removed as shown in FIG. 17E.

Accordingly, regardless of 3-phase balance or 3-phase unbalance state of the system power, the present invention can completely remove the harmonic components of the active power and the circulating current.

Figure 18:
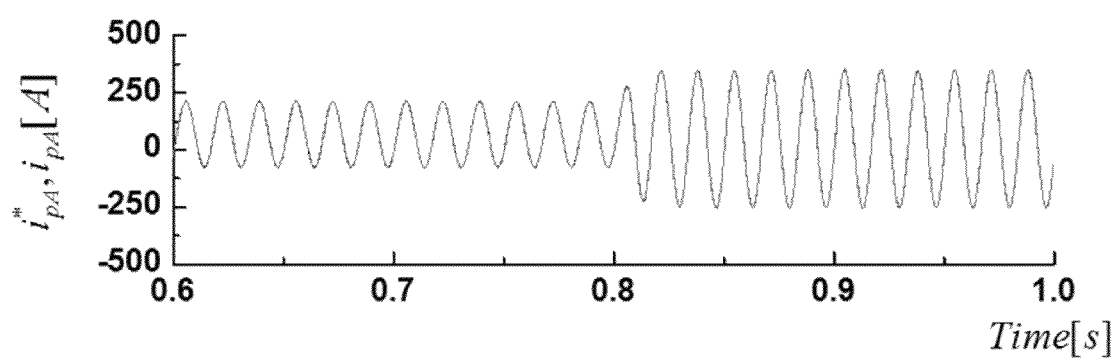
FIG. 18 is a view illustrating a valve current and a reference value of the valve current of the driving apparatus and method for the modular multi-level converter of FIG. 17.
Figure 19:
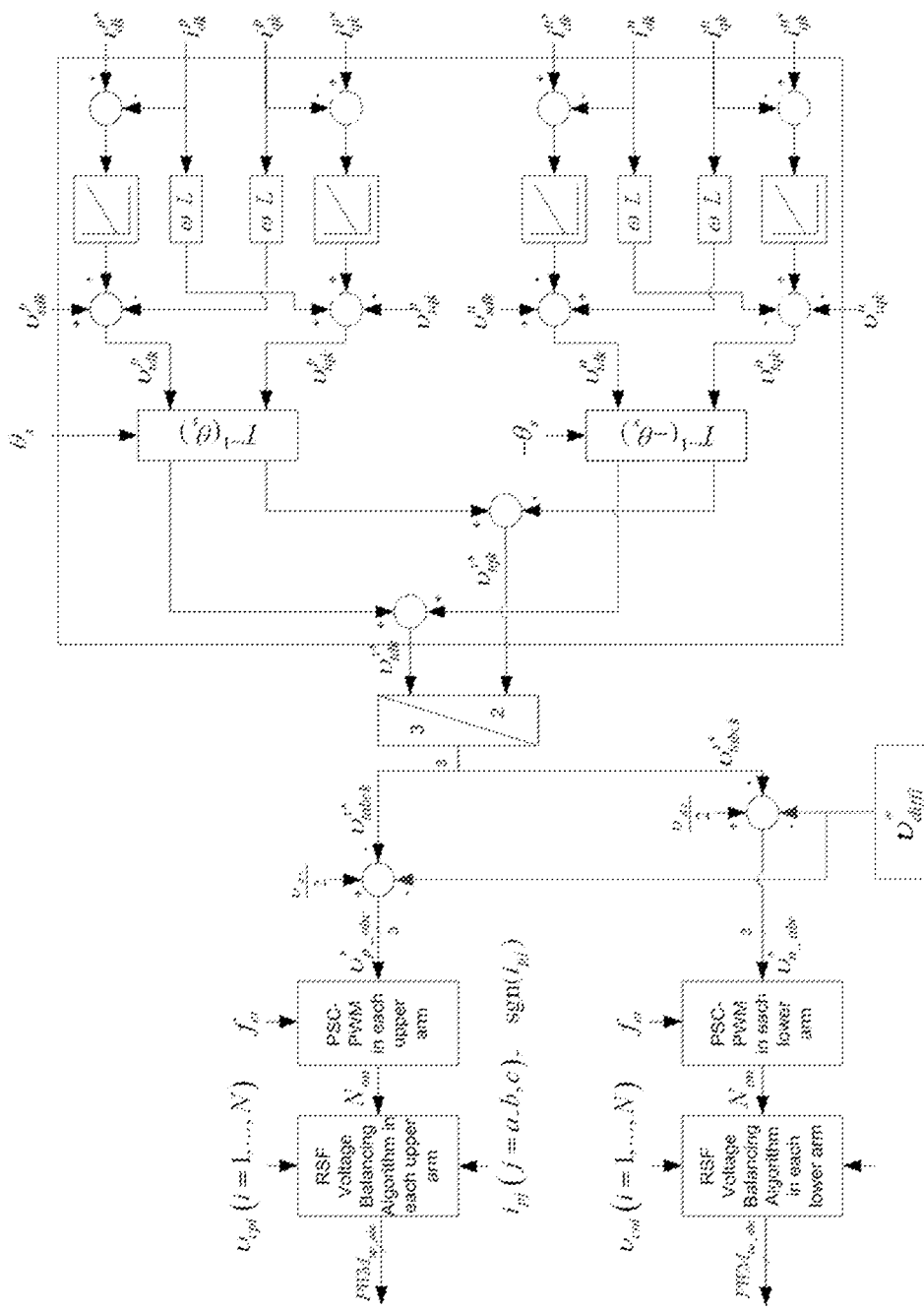
FIG. 19 is a view illustrating another example of typical circulating current suppression methods, proposed by Antonious Anotonopoulos and Maryam Saeedifard, where a region marked by a box shows a method proposed by Antonious Anotonopoulos and the other region shows a method proposed by Maryam Saeedifard.
Figure 20:
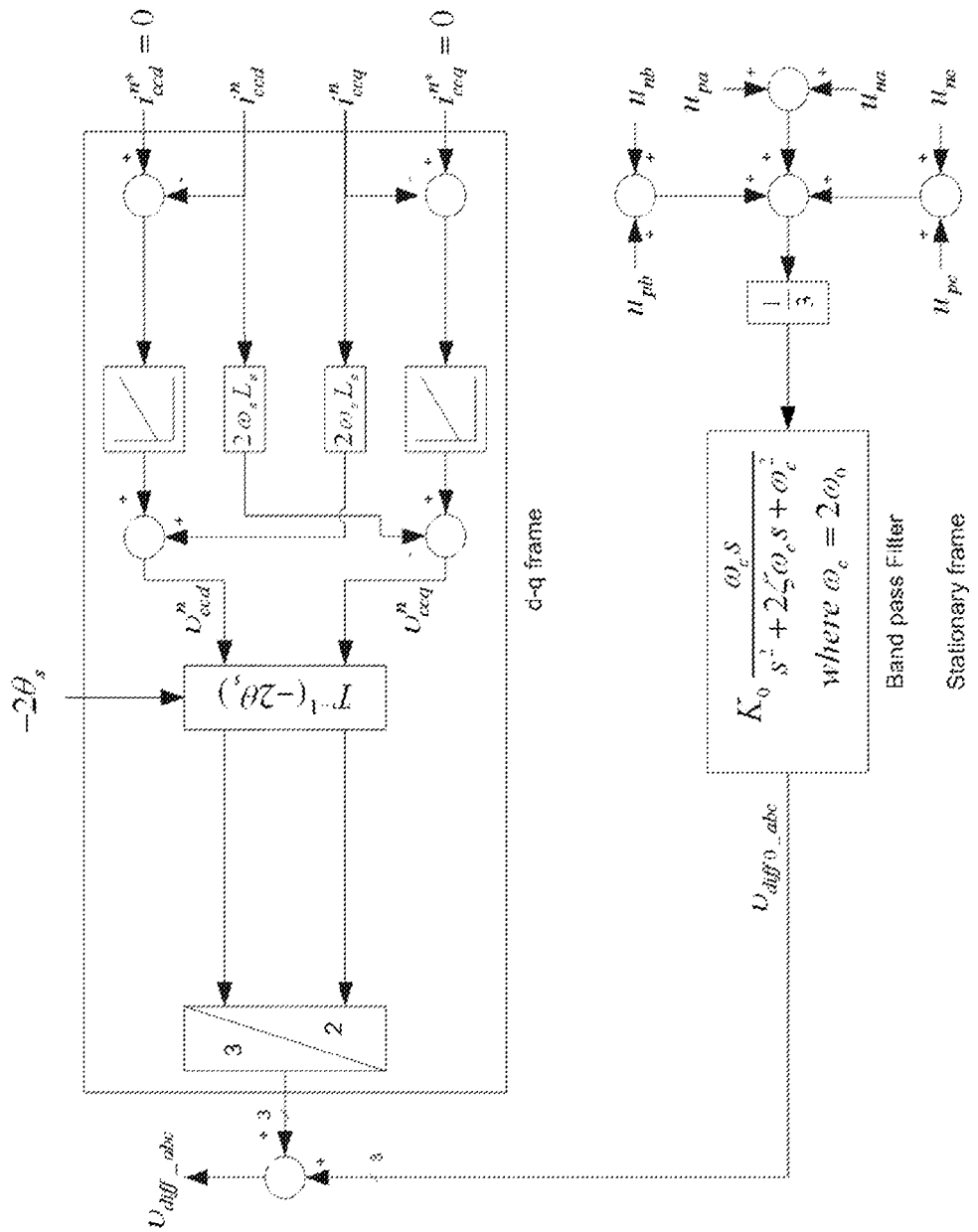
FIG. 20 is a view illustrating one of typical circulating current suppression methods, proposed by Qingrui Tu.
Figure 21:
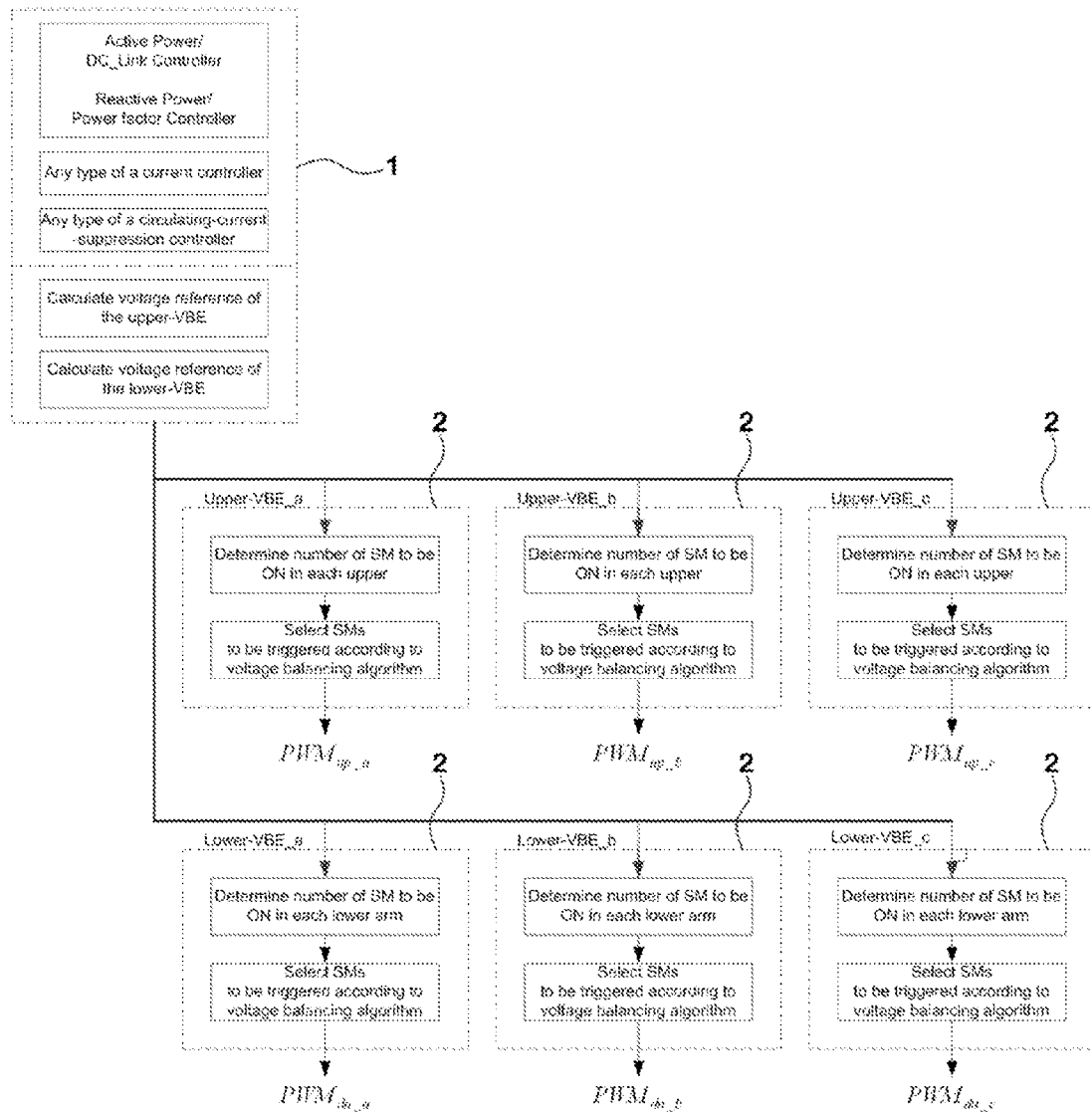
FIG. 21 is a view illustrating a control device for implementing a variety of typical methods described above.

FIG. 18 is a view illustrating a valve current and a reference value of the valve current of the driving apparatus and method for the modular multi-level converter of FIG. 17.

Even under the unbalance voltage condition, it can be seen that the driving apparatus and method for the modular multi-level converter according to the exemplary embodiment of the present invention allows the current value applied to the valve to be accurately converged to the valve current reference value.

As described above, a driving apparatus and method for a modular multi-level has the following effects First, six valves constituting a HVDC transmission system including a modular multi-level converter can be separately controlled.

In a typical driving method for a modular multi-level converter, since a current controller and a circulating current suppression controller are implemented with a 3-phase parameter, roles of six valve controller are limited to the number and sorting operation of submodules and the triggering of the submodules.

However, in the driving method for the modular multi-level converter according to the exemplary embodiment of the present invention, all of the current controller, the circulating current suppression controller, the calculation of the number of submodules, sorting, and triggering of submodules can be performed in the valve controller. That is, six valve controllers can be independently operated, and parallel processing can be performed.

Second, since implemented in the stationary reference frame, parameters need not be converted into the d-q frame, and a notch filter need not be used to remove noise included in signals of the d-q frame.

Also, in a typical driving method for a modular multi-level converter, since a method of measuring a circulating current and then allowing the circulating current to be "0" is used, a circulating current component needs to be calculated. However, in the driving method for the modular multi-level converter, since the circulating current can be suppressed by applying a method of simply suppressing an error harmonic signal corresponding to a half of the AC-grid frequency, the circulating current parameter need not be known. Accordingly, when the driving method for the modular multi-level converter is applied to the HVDC transmission method, the processing speed can be significantly improved.

Third, an AC component of the circulating current can be completely suppressed. Accordingly, a harmonic component included in a DC link current can be completely removed, and a harmonic component of an active power component flowing in an AC system can be completely removed.

Fourth, although an inductor and a resistor including in the valve controller vary within a limited magnitude or a manufacturing error or a disturbance occurs, suppression can be immediately performed. Accordingly, the present invention is advantageous in terms of the parameter variation and the signal disturbance.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A driving method for a modular multi-level converter that converts an alternating current (AC) into a direct current (DC) or converts a DC into an AC using the modular multi-level converter with a plurality of submodules stacked to deliver power in an AC system, the modular multi-level converter comprising a plurality of valves independently driven and an upper valve that is one of valve branches comprising the plurality of valves, the driving method comprising:
  inputting a current reference value ($i^*_{pj2}$) of the upper valve of the modular multi-level converter;
  measuring a current value ($i_{pj2}$) of the upper valve;
  calculating an error value ($err_{pj2}$) between the current reference value and the measured current value of the upper valve;
  measuring a DC link voltage value ($V_{dc2}$) of the modular multi-level converter;
  measuring an AC-grid voltage value ($E_{sj}$) of the modular multi-level converter; and
  calculating a voltage reference value ($u^*_{pj2}$) of the upper valve using the current reference value ($i^*_{pj2}$), the measured current value ($i_{pj2}$), the error value ($err_{pj2}$), the DC link voltage value ($V_{dc2}$), and the AC-grid voltage value ($E_{sj}$),
  wherein the inputting of the current reference value ($i^*_{pj2}$) of the upper valve of the modular multi-level converter comprises calculating the current reference value ($i^*_{pj2}$) using a following equation:

$$i^*_{pj2} = \frac{i^*_{dc2}}{3} + \frac{i^*_{sj}}{2} \quad (j = a, b, c),$$

and $i^*_{dc2}$ denotes a DC current reference value flowing in a DC system and $i^*_{sj}$ denotes a reference value regarding a phase current.

2. The driving method of claim 1, further comprising calculating a parameter variation value ($\hat{l}_{pj2}$) of a circulating current suppression inductor of the modular multi-level converter between the measuring of the AC-grid voltage value ($E_{sj}$) of the modular multi-level converter and calculating of the voltage reference value ($u^*_{pj2}$) of the upper valve using the current reference value, the measured current value, the error value, the DC link voltage value, and the AC-grid voltage value.

3. The driving method of claim 2, wherein the calculating of the parameter variation value ($\hat{l}_{pj2}$) of a circulating current suppression inductor of the modular multi-level converter comprises:
  obtaining a differential value of the parameter variation value of the circulating current suppression inductor using a following equation: $\dot{\hat{l}}_{pj2} = -m_1 err_{pj2}$; and
  integrating the differential value of the parameter variation value of the circulating current suppression inductor, wherein $m_1$ is a predetermined tuning constant.

4. The driving method of claim 2, wherein the calculating of the voltage reference value ($u^*_{pj2}$) of the upper valve using the current reference value ($i^*_{pj2}$), the measured current value ($i_{pj2}$), the error value ($err_{pj2}$), the DC link voltage value ($V_{dc2}$), the AC-grid voltage value ($E_{sj}$), and the parameter variation value ($\hat{l}_{pj2}$) of the circulating current suppression inductor comprises calculating the voltage reference value ($u^*$.sub.pj2) of the upper valve using a following equation:

$$u^*_{pj2} = \left(\frac{V_{dc2}}{2} - E_{sj}\right) - \{P(err_{pj2}) + R_1(err_{pj2}) + R_2(err_{pj2})\} + \{L_s \hat{l}_{pj2}\}.$$

5. The driving method of claim 2, wherein the calculating of the voltage reference value ($u^*_{pj2}$) of the upper valve using the current reference value ($i^*_{pj2}$), the measured current value ($i_{pj2}$), the error value ($err_{pj2}$), the DC link voltage value ($V_{dc2}$), the AC-grid voltage value ($E_{sj}$), and the parameter variation value ($\hat{l}_{pj2}$) of the circulating current suppression inductor comprises calculating the voltage reference value ($u^*_{pj2}$) of the upper valve using a following equation:

$$u^*_{pj2} = \left(\frac{V_{dc2}}{2} - E_{sj}\right) - \{P(err_{pj2}) + R_1(err_{pj2}) + R_2(err_{pj2})\} - \{L_s \dot{i}^*_{pj2} - L_s \hat{l}_{pj2}\}$$

6. The driving method of claim 1, wherein the calculating of the voltage reference value ($u^*_{pj2}$) of the upper valve using the current reference value ($i^*_{pj2}$), the measured current value ($i_{pj2}$), the error value ($err_{pj2}$), the DC link voltage value ($V_{dc2}$), and the AC-grid voltage value ($E_{sj}$) comprises calculating the voltage reference value ($u^*_{pj2}$) of the upper valve using a following equation:

$$u^*_{pj2} = \left(\frac{V_{dc2}}{2} - E_{sj}\right) - \{P(err_{pj2}) + R_1(err_{pj2}) + R_2(err_{pj2})\}.$$

7. The driving method of claim 1, wherein the calculating of the voltage reference value ($u^*_{pj2}$) of the upper valve using the current reference value ($i^*_{pj2}$), the measured current value ($i_{pj2}$), the error value ($err_{pj2}$), the DC link voltage value ($V_{dc2}$), and the AC-grid voltage value ($E_{sj}$) comprises calculating the voltage reference value ($u^*_{pj2}$) of the upper valve using a following equation:

$$u^*_{pj2} = \left(\frac{V_{dc2}}{2} - E_{sj}\right) - \{P(err_{pj2}) + R_1(err_{pj2}) + R_2(err_{pj2})\} - \{\rho_{pj2} \operatorname{sgn}(err_{pj2})\}$$

wherein a sign function denotes a function operated by following equations:

$$\operatorname{sgn}(err_{pj2}) = 1 (err_{pj2} > 0)$$

$$\operatorname{sgn}(err_{pj2}) = 0 (err_{pj2} \leq 0)$$

and $\rho_{pj2}$ denotes a proportional gain.

8. The driving method of claim 1, wherein the calculating of the voltage reference value ($u^*_{pj2}$) using the current reference value ($i^*_{pj2}$), the measured current value ($i^*_{pj2}$), the error value ($err_{pj2}$), the DC link voltage value ($V_{dc2}$), and the AC grid voltage value ($E_{sj}$) comprises calculating the voltage reference value ($u^*_{pj2}$) of the upper valve using a following equation:

$$u^*_{pj2} = \left(\frac{V_{dc}}{2} - E_{sj}\right) -$$
$$\{P(err_{pj2}) + R_1(err_{pj2}) + R_2(err_{pj2})\} - \left\{L_s i'^*_{pj2} + \rho_{pj2} \text{sgn}(err_{pj2})\right\}$$

wherein:
a sign function denotes a function operated by following equations:

$$\text{sgn}(err_{pj2}) = 1 (err_{pj2} > 0)$$

$$\text{sgn}(err_{pj2}) = 0 (err_{pj2} \leq 0)$$

$\rho_{pj2}$ denotes a proportional gain; and
$L_s$ denotes a circulating current suppression inductor of the upper valve.

9. The driving method of claim 4, wherein $P(err_{pj2})$, $R_1(err_{pj2})$, and $R_2(err_{pj2})$ are calculated using a following equations:

$$P(err_{pj2}) = (K_p) err_{pj2}$$

$$R_1(err_{pj2}) = \left(\frac{K_{i1}s}{s^2 + (\omega_o)^2}\right) err_{pj2}, \text{ and}$$

$$R_2(err_{pj2}) = \left(\frac{K_{i2}s}{s^2 + (2\omega_o)^2}\right) err_{pj2},$$

wherein $K_p$, $K_{i1}$, and $K_{i2}$ denote predetermined gain values, and $\omega_o$ denotes a AC-grid frequency.

10. The driving method of claim 1, wherein the reference value regarding the phase current expressed in a stationary reference frame is calculated using a following equation:

$$\begin{bmatrix} i^*_{sa} \\ i^*_{sb} \\ i^*_{sc} \end{bmatrix} = \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} i^*_{s\alpha} \\ i^*_{s\beta} \end{bmatrix},$$

and $i^*_{s\alpha}$ and $i^*_{s\beta}$ denote the reference value regarding the phase current expressed in a rotating stationary reference frame.

11. The driving method of claim 10, wherein:
an expression of the reference value regarding the phase current at a d-q frame is converted into an expression of the reference value regarding the phase current at the rotating stationary reference frame $i^*_{s\alpha}$ and $i^*_{s\beta}$ using a following equation:

$$i^*_{s\alpha\beta} = i_{sdq}^{\,p*} e^{j\omega t} + i_{sdq}^{\,n*} e^{-j\omega t};$$

$i_{sdq}^{\,p*}$ is an abbreviation of a d-axis and a q-axis ($i_{sq}^{\,p*}$, $i_{sd}^{\,p*}$) of a positive sequence component current reference value;

$i_{sdq}^{\,n*}$ is an abbreviation of a d-axis and a q-axis ($i_{sq}^{\,n*}$, $i_{sd}^{\,n*}$) of a negative sequence component current reference value;

$i_{sd}^{\,p*}$ denotes the d-axis of the positive sequence component current reference value;

$i_{sq}^{\,p*}$ denotes the q-axis of the positive sequence component current reference value;

$i_{sd}^{\,n*}$ denotes the d-axis of the negative sequence component current reference value;

$i_{sq}^{\,n*}$ denotes the q-axis of the negative sequence component current reference value;

$i_{sq}^{\,p*}$, $i_{sd}^{\,p*}$, $i_{sq}^{\,n*}$, and $i_{sq}^{\,n*}$ are calculated using a following equations:

$$i_{sq}^{\,p*} = PI(P^*_s - P_s),$$

$$i_{sd}^{\,p*} = PI(Q^*_s - Q_s),$$

$$i_{sq}^{\,n*} = -\frac{E^n_{sd}}{E^p_{sq}} i^p_{sd} - \frac{E^n_{sq}}{E^p_{sq}} i^p_{sq}, \text{ and}$$

$$i_{sd}^{\,n*} = \frac{E^n_{sq}}{E^p_{sq}} i^p_{sd} - \frac{E^n_{sd}}{E^p_{sq}} i^p_{sq};$$

and
$P_s$ denotes active power in an AC system, $P^*_s$ denotes a reference value of active power in the AC system, $Q_s$ denotes reactive power in the AC system, $Q^*_s$ denotes a reference value of reactive power in the AC system, $E_{sd}^p$ denotes a d-axis voltage of a positive sequence voltage flowing in the AC system, $E_{sq}^p$ denotes a q-axis voltage of a positive sequence voltage flowing in the AC system, $E_{sd}^n$ denotes a d-axis voltage of a negative sequence voltage flowing in the AC system, and $E_{sq}^n$ denotes a q-axis voltage of a negative sequence voltage flowing in the AC system.

12. The driving method of claim 1, wherein the reference value ($i^*_{dc2}$) of the DC system is calculated using a following equation:

$$i^*_{dc2} = \frac{3}{2}\left(\frac{E^p_{sq}}{V_{dc2}}\right) i^{p*}_{sq},$$

and
$E_{sq}^p$ denotes a q-axis voltage of a positive sequence component voltage flowing in an AC system and $i_{sq}^{p*}$ denotes a q-axis current of a positive sequence component current reference value flowing in the AC system.

13. The driving method of claim 1, after the calculating of the voltage reference value $u^*_{pj2}$ using the current reference value ($i^*_{pj2}$), the measured current value ($i_{pj2}$), the error value ($err_{pj2}$), the DC link voltage value ($V_{dc2}$), and the AC-grid voltage value ($E_{sj}$) comprising:
calculating a number of submodules to be triggered among submodules of the upper valve;
selecting submodules corresponding to the calculated number of submodules; and
applying a pulse width modulation signal to the selected submodules.

14. A driving method for a modular multi-level converter that converts an alternating current (AC) into a direct current (DC) or converts a DC into an AC using the modular multi-level converter with a plurality of submodules stacked to deliver power in an AC system, the modular multi-level converter comprising a plurality of valves independently driven and a lower valve that is one of valve branches comprising the plurality of valves, the driving method comprising:
inputting a current reference value ($i^*_{nj2}$) of the lower valve of the modular multi-level converter;
measuring a current value ($i_{nj2}$) of the lower valve;

calculating an error value ($err_{nj2}$) between the current reference value and the measured current value of the lower valve;

measuring a DC link voltage value ($V_{dc2}$) of the modular multi-level converter;

measuring an AC-grid voltage value ($E_{sj}$) of the modular multi-level converter; and calculating a voltage reference value ($u^*_{nj2}$) using the current reference value ($i^*_{nj2}$), the measured current value ($i_{nj2}$), the error value ($err_{nj2}$), the DC link voltage value ($V_{dc2}$), and the AC-grid voltage value ($E_{sj}$), wherein the inputting of the current reference value ($i^*_{nj2}$) of the upper valve of the modular multi-level converter comprises calculating the current reference value ($i^*_{nj2}$) using a following equation:

$$i^*_{nj2} = \frac{i^*_{dc2}}{3} - \frac{i^*_{sj}}{2},$$

and $i^*_{dc2}$ denotes a DC current reference value flowing in a DC system and $i^*_{sj}$ denotes a reference value regarding a phase current.

15. The driving method of claim 14, further comprising calculating a parameter variation value ($\hat{l}_{nj2}$) of a circulating current suppression inductor of the modular multi-level converter between the measuring of the AC-grid voltage value ($E_{sj}$) of the modular multi-level converter and calculating of the voltage reference value ($u^*_{nj2}$) using the current reference value, the measured current value, the error value, the DC link voltage value, and the system voltage value.

16. The driving method of claim 15, wherein the calculating of the parameter variation value ($\hat{l}_{nj2}$) of a circulating current suppression inductor of the modular multi-level converter comprises:

obtaining a differential value of the parameter variation value of the circulating current suppression inductor using a following equation:

$\dot{\hat{l}}_{nj2} = -m_2 err_{nj2}$; and integrating the differential value of the parameter variation value of the circulating current suppression inductor, wherein $m_2$ is a predetermined tuning constant.

17. The driving method of claim 16, wherein the calculating of the voltage reference value ($u^*_{nj2}$) of the lower valve using the current reference value ($i^*_{nj2}$), the measured current value ($u^*_{nj2}$), the error value (err.sub.nj2), the DC link voltage value ($V_{dc2}$), the AC-grid voltage value ($E_{sj}$), and the parameter variation value ($\hat{l}_{nj2}$) of the inductor comprises calculating the voltage reference value ($u^*_{nj2}$) of the lower valve using a following equation:

$$u^*_{nj2} = \left(\frac{V_{dc2}}{2} + E_{sj}\right) - \{P(err_{nj2}) + R_1(err_{nj2}) + R_2(err_{nj2})\} + \{L_s \hat{l}_{nj2}\}.$$

18. The driving method of claim 16, wherein the calculating of the voltage reference value ($u^*_{nj2}$) of the lower valve using the current reference value ($i^*_{nj2}$), the measured current value ($i_{nj2}$), the error value ($err_{nj2}$), the DC link voltage value ($V_{dc2}$), the AC-grid voltage value ($E_{sj}$), and the parameter variation value ($\hat{l}_{nj2}$) of the inductor comprises calculating the voltage reference value ($u^*_{nj2}$) of the lower valve using a following equation:

$$u^*_{nj2} = \left(\frac{V_{dc2}}{2} + E_{sj}\right) - \{P(err_{nj2}) + R_1(err_{nj2}) + R_2(err_{nj2})\} - \{L_s i^*_{nj2} - L_s \hat{l}_{nj2}\}.$$

19. The driving method of claim 15, wherein the calculating of the voltage reference value ($u^*_{nj2}$) of the lower valve using the current reference value ($i^*_{nj2}$), the measured current value ($i_{nj2}$), the error value ($err_{nj2}$), the DC link voltage value ($V_{dc2}$), and the AC-grid voltage value ($E_{sj}$) comprises calculating the voltage reference value ($u^*_{nj2}$) of the lower valve using a following equation:

$$u^*_{nj2} = \left(\frac{V_{dc2}}{2} + E_{sj}\right) - \{P(err_{nj2}) + R_1(err_{nj2}) + R_2(err_{nj2})\} + \{L_s i^*_{nj2} - L_s \hat{l}_{nj2}\}.$$

20. The driving method of claim 15, wherein the calculating of the voltage reference value ($u^*_{nj2}$) of the lower valve using the current reference value ($i^*_{nj2}$), the measured current value ($i_{nj2}$), the error value ($err_{nj2}$) the DC link voltage value ($V_{dc2}$), the AC-grid voltage value ($E_{sj}$), and an sgn function comprises calculating the voltage reference value ($u^*_{nj2}$) of the lower valve using a following equation:

$$u^*_{nj2} = \left(\frac{V_{dc2}}{2} + E_{sj}\right) - \{P(err_{nj2}) + R_1(err_{nj2}) + R_2(err_{nj2})\} - \{\rho_{nj2}\mathrm{sgn}(err_{nj2})\},$$

wherein the sign function denotes a sign function operated by following equations:

$\mathrm{sgn}(err_{nj2}) = 1 (err_{nj2} > 0)$ $\mathrm{sgn}(err_{nj2}) = 0 (err_{nj2} \leq 0)$ and $\rho_{nj2}$ denotes a proportional gain.

21. The driving method of claim 15, wherein the calculating of the voltage reference value ($u^*_{nj2}$) of the lower valve using the current reference value ($i^*_{nj2}$), the measured current value ($i_{nj2}$) the error value ($err_{nj2}$) the DC link voltage value ($V_{dc2}$), the AC-grid voltage value ($E_{sj}$), and an sgn function comprises calculating the voltage reference value ($u^*_{nj2}$) of the lower valve using a following equation:

$$u^*_{nj2} = \left(\frac{V_{dc2}}{2} + E_{sj}\right) -$$
$$\{P(err_{nj2}) + R_1(err_{nj2}) + R_2(err_{nj2})\} - \{L_s i^*_{nj2} + \rho_{nj2}\mathrm{sgn}(err_{nj2})\},$$

wherein the sign function denotes a sign function operated by following equations:

$\mathrm{sgn}(err_{nj2}) = 1 (err_{nj2} > 0)$ $\mathrm{sgn}(err_{nj2}) = 0 (err_{nj2} \leq 0)$ $\rho_{nj2}$ denotes a proportional gain; and $L_s$ denotes a circulating current suppression inductor of the upper valve.

22. The driving method of claim 19, wherein $P(\text{err}_{nj2})$, $R_1(\text{err}_{nj2})$, and $R_2(\text{err}_{nj2})$ are calculated using following equations:

$$P(\text{err}_{nj2}) = (K_p)\text{err}_{nj2},$$

$$R_1(\text{err}_{nj2}) = \left(\frac{K_{i1}s}{s^2 + (\omega_0)^2}\right)\text{err}_{nj2}, \text{ and}$$

$$R_2(\text{err}_{nj2}) = \left(\frac{K_{i2}s}{s^2 + (2\omega_0)^2}\right)\text{err}_{nj2},$$

wherein $K_p$, $K_{i1}$, and $K_{i2}$ denote predetermined gain values, and $\omega_o$ denotes a AC-grid frequency.

23. The driving method of claim 15, wherein the reference value regarding the phase current expressed in a stationary reference frame is calculated using a following equation:

$$\begin{bmatrix} i^*_{sa} \\ i^*_{sb} \\ i^*_{sc} \end{bmatrix} = \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} i^*_{s\alpha} \\ i^*_{s\beta} \end{bmatrix},$$

and $i^*_{s\alpha}$ and $i^*_{s\beta}$ denote the reference value regarding the phase current expressed in a rotating stationary reference frame.

24. The driving method of claim 23, wherein: an expression of the reference value regarding the phase current at a d-q frame is converted into an expression of the reference value regarding the phase current at the rotating stationary reference frame $i^*_{s\alpha}$ and $i^*_{s\beta}$ using a following equation:

$$i^*_{s\alpha\beta} = i_{sdq}^{p}{}^* e^{j\omega t} + i_{sdq}^{n}{}^* e^{-j\omega t}$$

$i_{sdq}^{p}{}^*$ is an abbreviation of a d-axis and a q-axis ($i_{sq}^{p*}$, $i_{sd}^{p*}$) of a positive sequence component current reference value;

$i_{sdq}^{n}{}^*$ is an abbreviation of a d-axis and a q-axis ($i_{sq}^{n*}$, $i_{sd}^{n*}$) of a negative sequence component current reference value;

$i_{sd}^{n*}$ denotes the d-axis of the positive sequence component current reference value;

$i_{sq}^{p*}$ denotes the q-axis of the positive sequence component current reference value;

$i_{sd}^{n*}$ denotes the d-axis of the negative sequence component current reference value;

$i_{sq}^{n*}$ denotes the q-axis of the negative sequence component current reference value;

$i_{sq}^{p*}$, $i_{sd}^{p*}$, $i_{sq}^{n*}$, and $i_{sd}^{n*}$ are calculated using following equations:

$$i_{sq}^{p*} = PI(P_s^* - P_s),$$

$$i_{sd}^{p*} = PI(Q_s^* - Q_s),$$

$$i_{sq}^{n*} = -\frac{E_{sd}^n}{E_{sq}^p}i_{sd}^p - \frac{E_{sq}^n}{E_{sq}^p}i_{sq}^p, \text{ and}$$

$$i_{sd}^{n*} = \frac{E_{sq}^n}{E_{sq}^p}i_{sd}^p - \frac{E_{sd}^n}{E_{sq}^p}i_{sq}^p;$$

and $P_s$ denotes active power in the AC system, $P^*_s$ denotes a reference value of active power in the AC system, $Q_s$ denotes reactive power in the AC system, $Q^*_s$ denotes a reference value of reactive power in the AC system, $E_{sd}^p$ denotes a d-axis voltage of a positive sequence voltage flowing in the AC system, $E_{sd}^n$ denotes a q-axis voltage of a positive sequence voltage flowing in the AC system, $E_{sq}^n$ denotes a d-axis voltage of a negative sequence voltage flowing in the AC system, and $E_{sq}^n$ denotes a q-axis voltage of a negative sequence voltage flowing in the AC system.

25. The driving method of claim 24, wherein the reference value ($i^*_{dc2}$) of the DC system is calculated using a following equation:

$$i^*_{dc2} = \frac{3}{2}\left(\frac{E_{sq}^p}{V_{dc2}}\right)i_{sq}^{p*},$$

and $E_{sq}^p$ denotes a q-axis voltage of a positive sequence component voltage flowing in the AC system and $i_{sq}^{p*}$ denotes a q-axis current of a positive sequence component current reference value flowing in the AC system.

26. The driving method of claim 15, after the calculating of the voltage reference value ($u^*_{nj2}$) using the current reference value ($i^*_{nj2}$), the measured current value ($i_{nj2}$), the error value ($\text{err}_{nj2}$), the DC link voltage value ($V_{dc2}$), and the AC-grid voltage value ($E_{sj}$), comprising: calculating the number of submodules to be triggered among submodules of the upper valve;

selecting submodules corresponding to the number of submodules; and applying a pulse width modulation signal to the selected submodules.

27. The driving method of claim 20, wherein the driving method for the modular multi-level converter is driven at a valve unit of the modular multi-level converter.

28. A driving apparatus for a modular multi-level converter, comprising:

an input unit receiving a current reference value of an upper valve of one valve branch of the modular multi-level converter;

a current measuring unit for measuring a current value of the upper valve of one valve branch of the modular multi-level converter;

a direct current (DC) link voltage measuring unit for measuring a voltage value of a DC link of the modular multi-level converter;

a system voltage measuring unit for measuring a system voltage value of the modular multi-level converter;

an error calculating unit for calculating an error value between the current reference value received by the input unit and the current value measured by the current measuring unit;

a proportional controller proportionally amplifying the error value calculated by the error calculating unit with a predetermined gain value;

a first resonant-type current controller receiving the error value calculated by the error calculating unit to converge an error current equal to an AC-grid frequency to zero;

a second resonant-type current controller receiving the error value calculated by the error calculating unit to converge a harmonic error current about two times larger than the AC-grid frequency to zero; and a voltage reference value calculating unit for calculating a voltage reference value of the upper valve of the one valve branch of the modular multi-level converter using values calculated by the DC link voltage measuring unit, the system voltage measuring unit, the proportional controller, the first resonant-type current controller, and the second resonant-type current controller.

29. The driving apparatus of claim 28, further comprising: a submodule selecting unit for selecting submodules to be triggered corresponding to a calculated number of submodules to be triggered using the voltage reference value calculated by the voltage reference value calculating unit; and a pulse width modulation signal generating unit applying a pulse width modulation signal to the submodules selected by the submodule selecting unit.

30. The driving apparatus of claim 28, wherein the proportional controller amplifies the error value calculated by the error calculating unit to a gain value.

31. The driving apparatus of claim 28, wherein the first resonant-type current controller multiplies the error value calculated by the error calculating unit and the following equation:

$$\frac{K_{i1}s}{s^2 + (\omega_o)^2}$$

to converge the error current to zero, and $K_{i1}$ denotes a predetermined gain value of the first resonant-type current controller and $\omega_o$ denotes the AC-grid frequency.

32. The driving apparatus of claim 28, wherein the second resonant-type current controller multiplies the error value calculated by the error calculating unit and the following equation:

$$\frac{K_{i2}s}{s^2 + (2\omega_o)^2}$$

to converge the harmonic error current about two times larger than the AC-grid frequency to zero, and $K_{i1}$ denotes a predetermined gain value of the second resonant-type current controller and .omega . . . sub.o denotes the AC-grid frequency.

33. The driving apparatus of claim 28, wherein the voltage reference value calculating unit obtains a voltage difference by subtracting the system voltage value measured by the system voltage measuring unit from a half of the voltage value measured by the DC link voltage measuring unit, and calculates the voltage reference value by subtracting a sum of calculated values outputted by the proportional controller, the first resonant-type current controller, and the second resonant-type current controller from the voltage difference.

34. The driving apparatus of claim 28, further comprising a compensator reducing an error generated from the modular multi-level converter, wherein the compensator obtains an sgn output value by inputting the error value of the error calculating unit into an sgn function and then calculates a compensation value by multiplying the sgn output value and a proportional gain of the sgn function.

35. The driving apparatus of claim 34, wherein the voltage reference value calculating unit further receives an output value of the compensator to obtain a voltage difference by subtracting the system voltage value measured by the system voltage measuring unit from a half of the voltage value measured by the DC link voltage measuring unit, and calculates the voltage reference value by subtracting a sum of calculated values outputted by the proportional controller, the first resonant-type current controller, the second resonant-type current controller, and the compensator from the voltage difference.

36. The driving apparatus of claim 28, further comprising an estimator that obtains a variation estimation value by multiplying and integrating the error value calculated by the error calculating unit and a predetermined tuning constant.

37. The driving apparatus of claim 36, wherein the voltage reference value calculating unit further receives an estimation value of the estimator to obtain a voltage difference by subtracting the system voltage value measured by the system voltage measuring unit from a half of the voltage value measured by the DC link voltage measuring unit, and calculates the voltage reference value by subtracting a sum of calculated values outputted by the proportional controller, the first resonant-type current controller, the second resonant-type current controller, the compensator, and the estimator from the voltage difference.

38. A driving apparatus for a modular multi-level converter, comprising:

an input unit receiving a current reference value of a lower valve of one valve branch of the modular multi-level converter;

a current measuring unit for measuring a current value of the lower valve of one valve branch of the modular multi-level converter;

a direct current (DC) link voltage measuring unit for measuring a voltage value of a DC link of the modular multi-level converter;

a system voltage measuring unit for measuring a system voltage value of the modular multi-level converter;

an error calculating unit for calculating an error value between the current reference value received by the input unit and the current value measured by the current measuring unit;

a proportional controller proportionally amplifying the error value calculated by the error calculating unit with a predetermined gain value;

a first resonant-type current controller receiving the error value calculated by the error calculating unit to converge an error current equal to a AC-grid frequency to zero;

a second resonant-type current controller receiving the error value calculated by the error calculating unit to converge a harmonic error current about two times larger than the AC-grid frequency to zero; and a voltage reference value calculating unit for calculating a voltage reference value of the lower valve of the one valve branch of the modular multi-level converter using values calculated by the DC link voltage measuring unit, the system voltage measuring unit, the proportional controller, the first resonant-type current controller, and the second resonant-type current controller.

39. The driving apparatus of claim 38, further comprising: a submodule selecting unit for selecting submodules to be triggered corresponding to a calculated number of submodules to be triggered using the voltage reference value calculated by the voltage reference value calculating unit; and a pulse width modulation signal generating unit applying a pulse width modulation signal to the submodules selected by the submodule selecting unit.

40. The driving apparatus of claim 38, wherein the proportional controller amplifies the error value calculated by the error calculating unit to a gain value.

41. The driving apparatus of claim 38, wherein the first resonant-type current controller multiplies the error value calculated by the error calculating unit and a following equation:

$$\frac{K_{i1}s}{s^2 + (\omega_o)^2}$$

to converge the error current to zero, and $K_{i1}$ denotes a predetermined gain value of the first resonant-type current controller and $\omega_o$ denotes the AC-grid frequency.

42. The driving apparatus of claim 38, wherein the second resonant-type current controller multiplies the error value calculated by the error calculating unit and a following equation:

$$\frac{K_{i2}s}{s^2 + (2\omega_o)^2}$$

to converge the harmonic error current about two times larger than the AC-grid frequency to zero, and $K_{i2}$ denotes a predetermined gain value of the second resonant-type current controller and $\omega_o$ denotes the AC-grid frequency.

43. The driving apparatus of claim 38, wherein the voltage reference value calculating unit obtains a voltage sum by adding the system voltage value measured by the system voltage measuring unit to a half of the voltage value measured by the DC link voltage measuring unit, and calculates the voltage reference value by subtracting a sum of calculated values outputted by the proportional controller, the first resonant-type current controller, and the second resonant-type current controller from the voltage sum.

44. The driving apparatus of claim 38, further comprising a compensator reducing an error generated from the modular multi-level converter, wherein the compensator obtains an sgn output value by inputting the error value of the error calculating unit into an sgn function and then calculates a compensation value by multiplying the sgn output value and a proportional gain of the sgn function.

45. The driving apparatus of claim 44, wherein the voltage reference value calculating unit further receives an output value of the compensator to obtain a voltage sum by adding the system voltage value measured by the system voltage measuring unit to a half of the voltage value measured by the DC link voltage measuring unit, and calculates the voltage reference value by subtracting a sum of calculated values outputted by the proportional controller, the first resonant-type current controller, the second resonant-type current controller, and the compensator from the voltage sum.

46. The driving apparatus of claim 38, further comprising an estimator that obtains a variation estimation value by multiplying and integrating the error value calculated by the error calculating unit and a predetermined constant.

47. The driving apparatus of claim 38, wherein the voltage reference value calculating unit further receives an estimation value of the estimator to obtain a voltage sum by adding the system voltage value measured by the system voltage measuring unit to a half of the voltage value measured by the DC link voltage measuring unit, and calculates the voltage reference value by subtracting a sum of calculated values outputted by the proportional controller, the first resonant-type current controller, the second resonant-type current controller, the compensator, and the estimator from the voltage sum.

48. The driving apparatus of claim 38, wherein the driving apparatus for the modular multi-level converter is driven at a valve unit of the modular multi-level converter.

49. The driving method of claim 5, wherein $P(\text{err}_{pj2})$, $R_1(\text{err}_{pj2})$, and $R_2(\text{err}_{pj2})$ are calculated using following equations:

$$P(err_{pj2}) = (K_p)err_{pj2}$$
$$R_1(err_{pj2}) = \left(\frac{K_{i1}s}{s^2 + (\omega_o)^2}\right)err_{pj2}, \text{ and}$$
$$R_2(err_{pj2}) = \left(\frac{K_{i2}s}{s^2 + (2\omega_o)^2}\right)err_{pj2},$$

wherein $K_p$, $K_{i1}$, and $K_{i2}$ denote predetermined gain values, and $\omega_o$ denotes a AC-grid frequency.

50. The driving method of claim 6, wherein $P(\text{err}_{pj2})$, $R_1(\text{err}_{pj2})$, and $R_2(\text{err}_{pj2})$ are calculated using following equations:

$$P(err_{pj2}) = (K_p)err_{pj2}$$
$$R_1(err_{pj2}) = \left(\frac{K_{i1}s}{s^2 + (\omega_o)^2}\right)err_{pj2}, \text{ and}$$
$$R_2(err_{pj2}) = \left(\frac{K_{i2}s}{s^2 + (2\omega_o)^2}\right)err_{pj2},$$

wherein $K_p$, $K_{i1}$, and $K_{i2}$ denote predetermined gain values, and $\omega_o$ denotes a AC-grid frequency.

51. The driving method of claim 7, wherein $P(\text{err}_{pj2})$, $R_1(\text{err}_{pj2})$, and $R_2(\text{err}_{pj2})$ are calculated using following equations:

$$P(err_{pj2}) = (K_p)err_{pj2}$$
$$R_1(err_{pj2}) = \left(\frac{K_{i1}s}{s^2 + (\omega_o)^2}\right)err_{pj2}, \text{ and}$$
$$R_2(err_{pj2}) = \left(\frac{K_{i2}s}{s^2 + (2\omega_o)^2}\right)err_{pj2},$$

wherein $K_p$, $K_{i1}$, and $K_{i2}$ denote predetermined gain values, and $\omega_o$ denotes a AC-grid frequency.

52. The driving method claim 8, wherein $P(\text{err}_{pj2})$, $R_1(\text{err}_{pj2})$, and $R_2(\text{err}_{pj2})$ are calculated using the following equations:

$$P(err_{nj2}) = (K_p)err_{nj2},$$
$$R_1(err_{nj2}) = \left(\frac{K_{i1}s}{s^2 + (\omega_o)^2}\right)err_{nj2}, \text{ and}$$
$$R_2(err_{nj2}) = \left(\frac{K_{i2}s}{s^2 + (2\omega_o)^2}\right)err_{nj2},$$

wherein $K_p$, $K_{i1}$, and $K_{i2}$ denote predetermined gain values, and $\omega_o$ denotes a AC-grid frequency.

53. The driving method of claim 4, wherein $P(\text{err}_{nj2})$, $R_1(\text{err}_{nj2})$, and $R_2(\text{err}_{nj2})$ are calculated using following equations:

$$P(err_{nj2}) = (K_p)err_{nj2},$$

$$R_1(err_{nj2}) = \left(\frac{K_{i1}s}{s^2+(\omega_o)^2}\right)err_{nj2}, \text{ and}$$

$$R_2(err_{nj2}) = \left(\frac{K_{i2}s}{s^2+(2\omega_o)^2}\right)err_{nj2},$$

wherein $K_p$, $K_{i1}$, and $K_{i2}$ denote predetermined gain values, and $\omega_o$ denotes a AC-grid frequency.

54. The driving method claim 5, wherein $P(err_{nj2})$, $R_1(err_{nj2})$, and $R_2(err_{nj2})$ are calculated using following equations:

$$P(err_{nj2}) = (K_p)err_{nj2},$$

$$R_1(err_{nj2}) = \left(\frac{K_{i1}s}{s^2+(\omega_o)^2}\right)err_{nj2}, \text{ and}$$

$$R_2(err_{nj2}) = \left(\frac{K_{i2}s}{s^2+(2\omega_o)^2}\right)err_{nj2},$$

wherein $K_p$, $K_{i1}$, and $K_{i2}$ denote predetermined gain values, and $\omega_o$ denotes a AC-grid frequency.

55. The driving method claim 6, wherein $P(err_{nj2})$, $R_1(err_{nj2})$, and $R_2(err_{nj2})$ are calculated using following equations:

$$P(err_{pj2}) = (K_p)err_{pj2},$$

$$R_1(err_{pj2}) = \left(\frac{K_{i1}s}{s^2+(\omega_o)^2}\right)err_{pj2}, \text{ and}$$

$$R_2(err_{pj2}) = \left(\frac{K_{i2}s}{s^2+(2\omega_o)^2}\right)err_{pj2},$$

wherein $K_p$, $K_{i1}$, and $K_{i2}$ denote predetermined gain values, and $\omega_o$ denotes a AC-grid frequency.

56. The driving method of claim 15, wherein the driving method for the modular multi-level converter is driven at a valve unit of the modular multi-level converter.

57. The driving apparatus of claim 38, wherein the driving apparatus for the modular multi-level converter is driven at a valve unit of the modular multi-level converter.

* * * * *